United States Patent
Maguire et al.

(10) Patent No.: US 9,328,513 B2
(45) Date of Patent: *May 3, 2016

(54) SKYLIGHT AND METHOD OF FABRICATING THE SAME

(71) Applicant: Bellwether Design Technologies, LLC, Biddeford, ME (US)

(72) Inventors: Michael C. Maguire, Saco, ME (US); William J. Wright, Alfred, ME (US); Brian J. Harrington, Cape Elizabeth, ME (US)

(73) Assignee: Bellwether Design Technologies, LLC, Biddeford, ME (US)

(*) Notice: Subject to any disclaimer, the term of this patent is extended or adjusted under 35 U.S.C. 154(b) by 0 days.

This patent is subject to a terminal disclaimer.

(21) Appl. No.: 14/688,375

(22) Filed: Apr. 16, 2015

(65) Prior Publication Data
US 2015/0218825 A1    Aug. 6, 2015

Related U.S. Application Data

(62) Division of application No. 13/833,812, filed on Mar. 15, 2013, now Pat. No. 9,045,905.

(51) Int. Cl.
*E04D 13/03* (2006.01)
*E04D 3/08* (2006.01)
*E04B 7/06* (2006.01)

(52) U.S. Cl.
CPC ............... *E04D 13/0305* (2013.01); *E04D 3/08* (2013.01); *E04D 13/032* (2013.01); *E04D 13/0315* (2013.01); *E04B 2007/066* (2013.01)

(58) Field of Classification Search
CPC ..... E04D 13/03; E04D 13/035; E04D 13/032; E04D 3/06; E04D 3/08; E04D 2003/0875; E04D 2003/0887; E04D 2003/0818; E04D 2003/0856; E04B 7/08; E04B 7/20; E04B 2007/006; E06B 3/549; E06B 3/68; E06B 1/38; E06B 1/366

USPC .......... 52/81.1, 82, 91.3, 204.57, 204.58, 52/204.593, 204.62, 204.67, 204.68, 200, 52/282.5, 235, 584.1, 786.1, 786.13, 461, 52/466, 468

See application file for complete search history.

(56) References Cited

U.S. PATENT DOCUMENTS 260,294 A    6/1882  Hefele
429,375 A    6/1890  Coulson
(Continued)

FOREIGN PATENT DOCUMENTS

CH    597451 A  *  4/1978
EP    169340        1/1986
(Continued)

OTHER PUBLICATIONS

Notification of International Search Report and Written Opinion in PCT application No. PCT/US2014/0020735 dated Jul. 30, 2014, 11 pp.
(Continued)

*Primary Examiner* — Robert Canfield
(74) *Attorney, Agent, or Firm* — Caseiro Burke LLC; Chris A. Caseiro

(57) ABSTRACT

A skylight system including a support frame and an apex patch fitting that together support a plurality of glass pieces joined together in a selectable shape. The support frame includes a sill and a setting chair that are arranged to support the base portions of the glass pieces. The apex patch fitting may be of selectable shape and includes an upper and lower member to retain the peaks or corners of the glass therebetween. The apex patch fitting includes one or more positioning keys to align and secure the glass pieces. A method of making the skylights includes the use of an apex retainer tool to maintain the apex patch fitting in a fixed position while placing glass pieces on it. Multiple apex patch fittings can be used for a skylight, including a skylight that is ridge shaped or hipped ridge shape.

5 Claims, 30 Drawing Sheets

(56) References Cited

U.S. PATENT DOCUMENTS

| | | | |
|---|---|---|---|
| 861,266 A * | 7/1907 | Conley | 52/204.58 |
| 876,299 A * | 1/1908 | Conley | 52/204.57 |
| 984,267 A * | 2/1911 | Ferres | 52/204.57 |
| 1,119,829 A | 12/1914 | Jeter | |
| 1,168,942 A | 1/1916 | Irwin | |
| 1,280,913 A | 10/1918 | Waugh | |
| 1,379,359 A | 5/1921 | Partzschefeld | |
| 1,543,330 A | 6/1925 | Grenier | |
| 1,656,044 A | 1/1928 | Cibulas | |
| 1,664,543 A * | 4/1928 | Easterman | 52/204.58 |
| 1,681,201 A * | 8/1928 | Wachter | 52/204.57 |
| 1,734,840 A | 11/1929 | Volk | |
| 1,772,068 A | 8/1930 | Cibulas | |
| 1,840,041 A | 1/1932 | Kellogg | |
| 1,921,303 A | 8/1933 | Raschka | |
| 1,931,750 A | 10/1933 | Blaski | |
| 1,946,733 A * | 2/1934 | Davis | 52/204.57 |
| 1,966,673 A | 7/1934 | Linck | |
| 1,968,125 A | 7/1934 | Cibulas | |
| 2,014,925 A | 9/1935 | Bradley | |
| 2,103,832 A * | 12/1937 | Tindall | 52/204.58 |
| 2,175,653 A | 10/1939 | Williams | |
| 2,232,793 A * | 2/1941 | Lowry | 52/464 |
| 2,759,439 A | 8/1956 | MacMillan | |
| 2,800,983 A * | 7/1957 | Toney | 52/464 |
| 2,982,054 A | 6/1961 | Anderson | |
| 3,028,938 A * | 4/1962 | Schorr | 52/464 |
| 3,136,395 A * | 6/1964 | Rebele | 52/844 |
| 3,158,961 A | 12/1964 | Hawkins | |
| 3,394,526 A * | 7/1968 | Engelbrecht | 52/708 |
| 3,492,770 A * | 2/1970 | Furner | 52/204.597 |
| 3,721,053 A | 3/1973 | Geyser | |
| 4,114,330 A | 9/1978 | Sukolics | |
| 4,120,130 A * | 10/1978 | Puschkarski | 52/282.5 |
| 4,158,938 A * | 6/1979 | Meechan et al. | 52/463 |
| 4,251,964 A | 2/1981 | Francis | |
| 4,455,807 A * | 6/1984 | Ehrlich | 52/770 |
| 4,501,099 A | 2/1985 | Boaz | |
| 4,617,772 A * | 10/1986 | Hassell | 52/461 |
| 4,621,472 A | 11/1986 | Kloke | |
| 4,642,949 A | 2/1987 | Hopper | |
| 4,774,790 A | 10/1988 | Hopper | |
| 4,850,167 A * | 7/1989 | Beard et al. | 52/200 |
| 4,942,711 A * | 7/1990 | Bergquist | 52/204.591 |
| 5,040,347 A * | 8/1991 | Valvis | 52/204.591 |
| 5,163,257 A * | 11/1992 | Crowell | 52/200 |
| 5,233,803 A * | 8/1993 | Bockmiller | 52/239 |
| 5,369,924 A | 12/1994 | Neudorf | |
| 5,414,967 A * | 5/1995 | Cates et al. | 52/281 |
| 5,636,484 A * | 6/1997 | DeBlock | 52/204.5 |
| 6,016,632 A * | 1/2000 | McGee et al. | 52/241 |
| 6,098,347 A | 8/2000 | Jaeger et al. | |
| 6,209,275 B1 * | 4/2001 | Cates et al. | 52/283 |
| 6,223,481 B1 | 5/2001 | Rickman | |
| 7,823,365 B2 * | 11/2010 | Ward et al. | 52/786.13 |
| 8,769,909 B2 * | 7/2014 | McNamee | 52/656.9 |
| 2011/0298185 A1 | 12/2011 | Dolby et al. | |

FOREIGN PATENT DOCUMENTS

| | | |
|---|---|---|
| GB | 2204627 | 11/1988 |
| GB | 2236792 | 4/1991 |
| JP | 06212751 | 8/1994 |

OTHER PUBLICATIONS

Applicant's statement regarding foreign patent translations dated Apr. 22, 2015, 1pp.

* cited by examiner

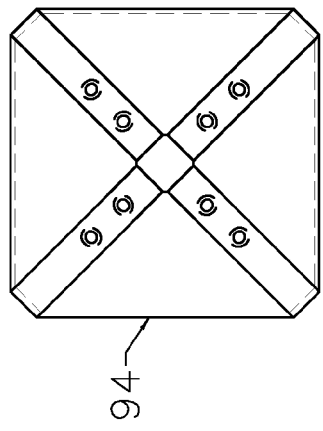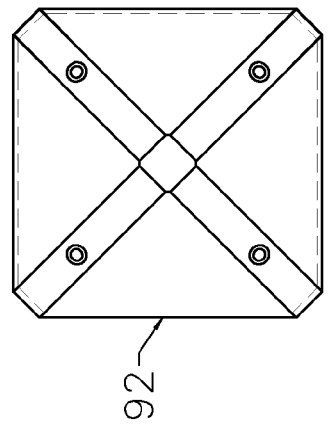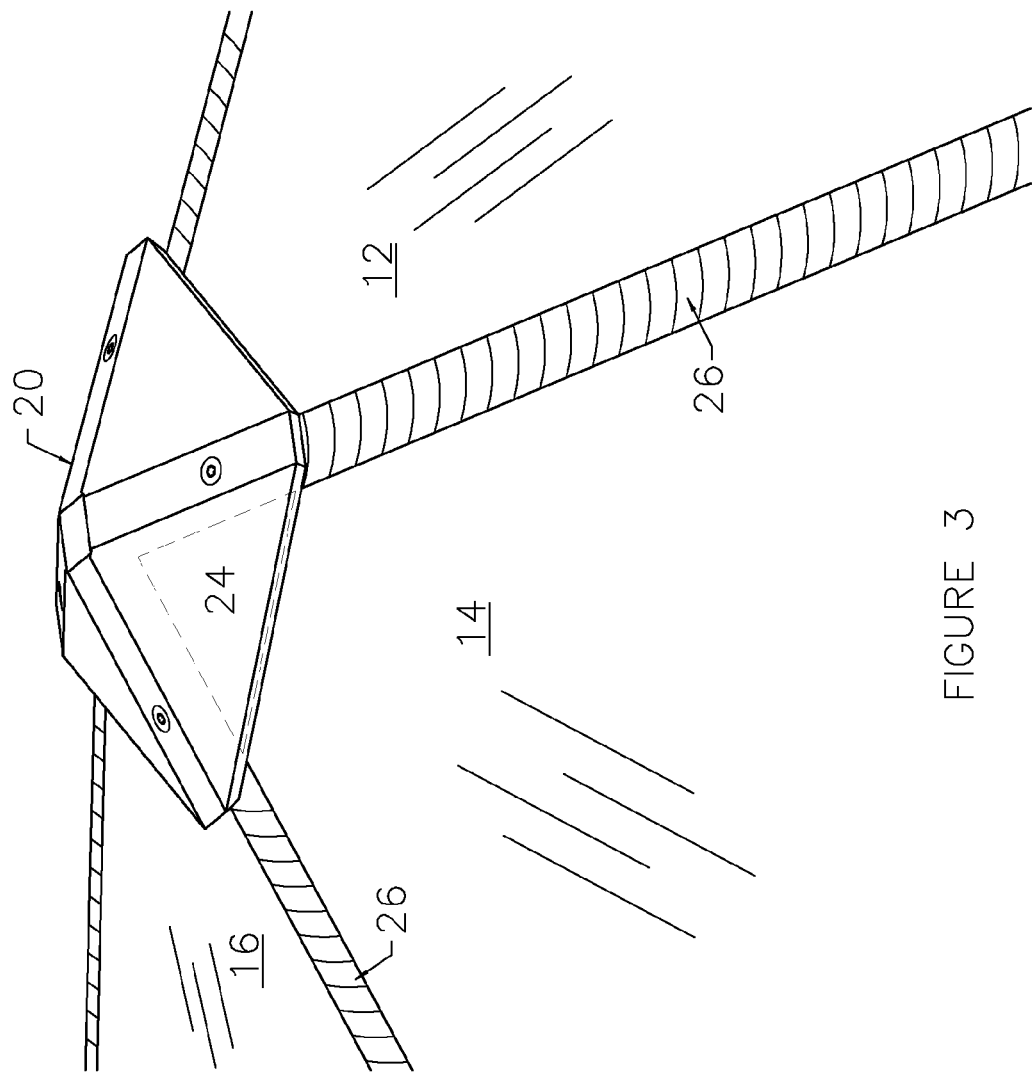

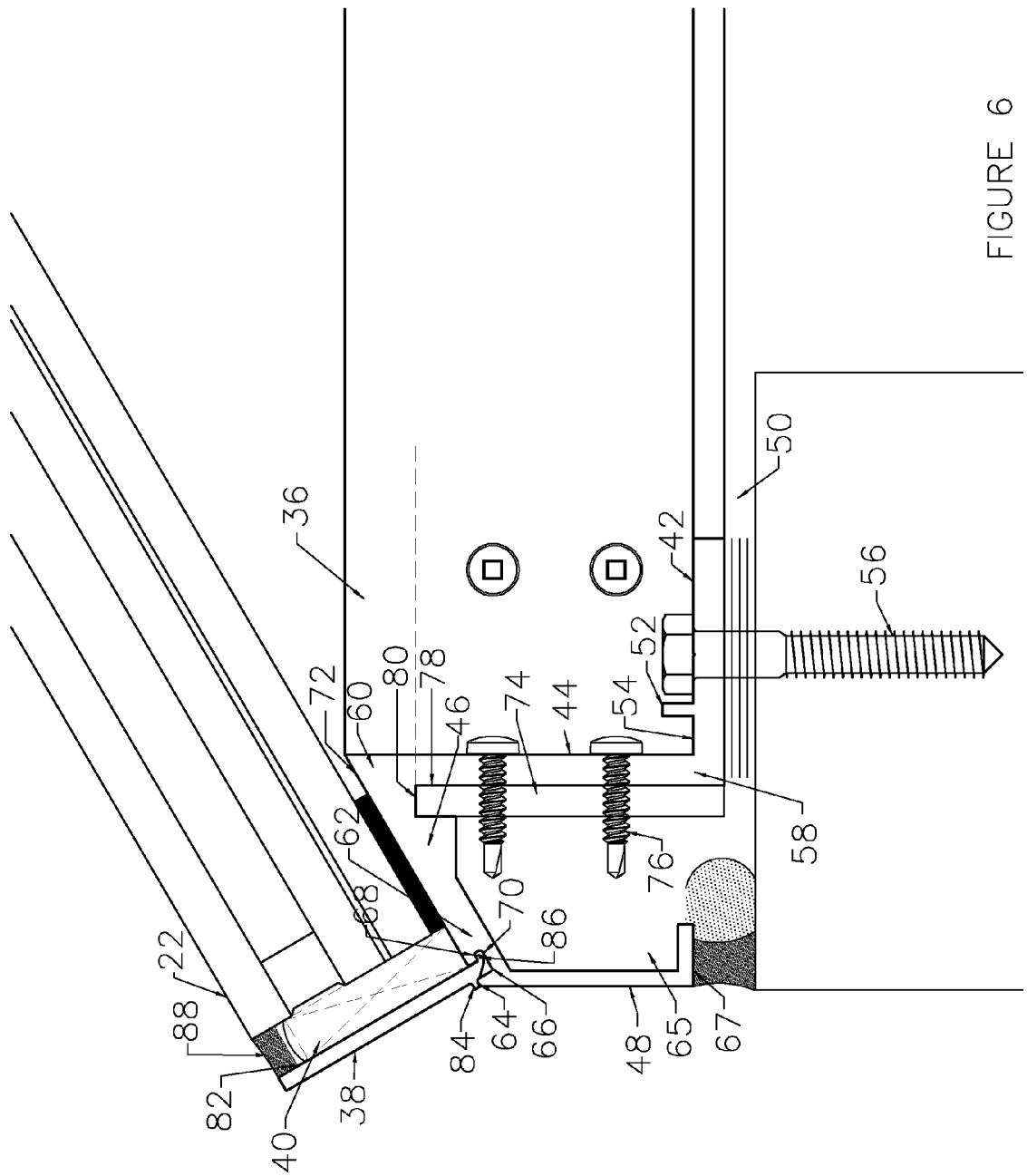

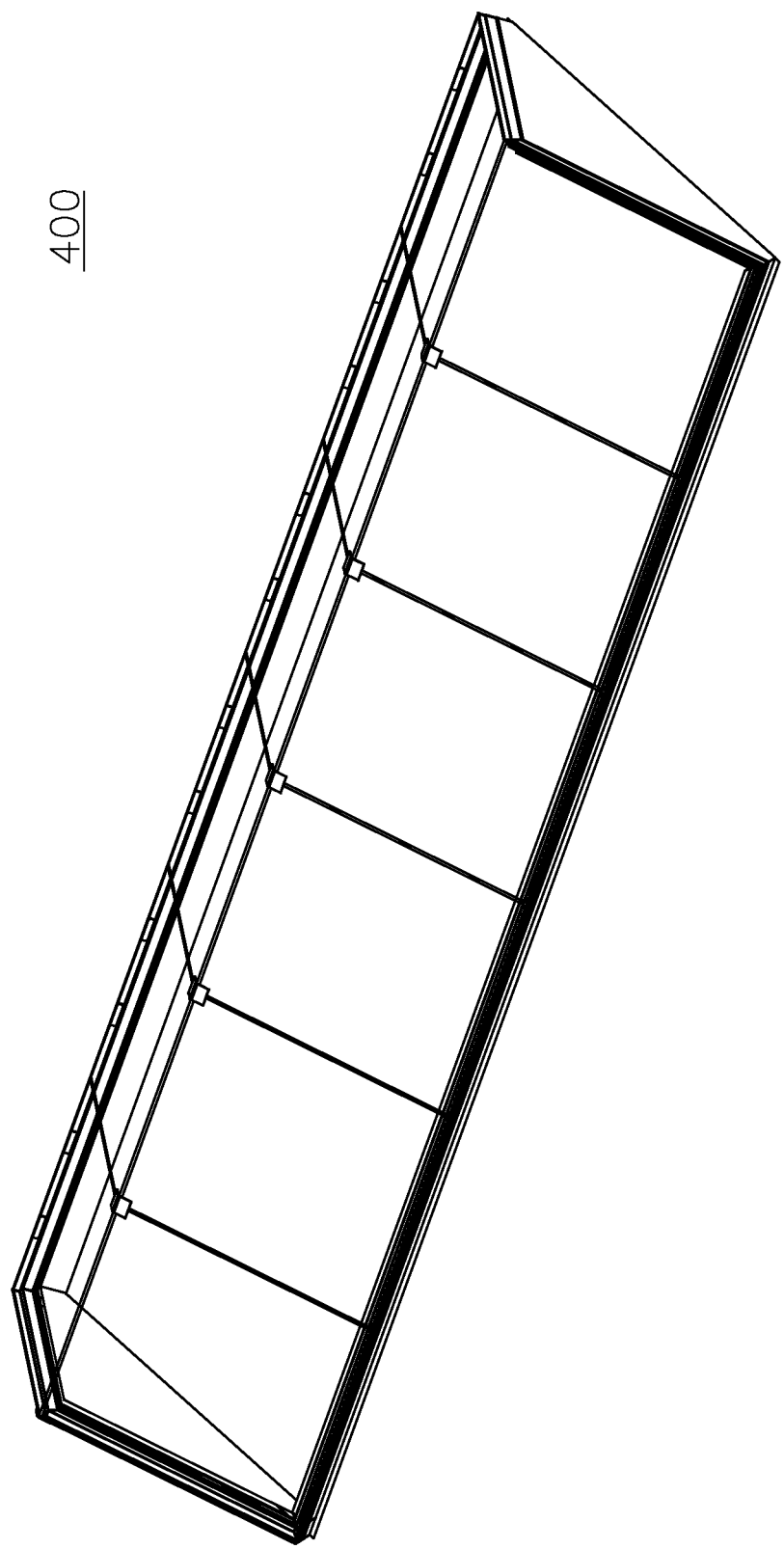

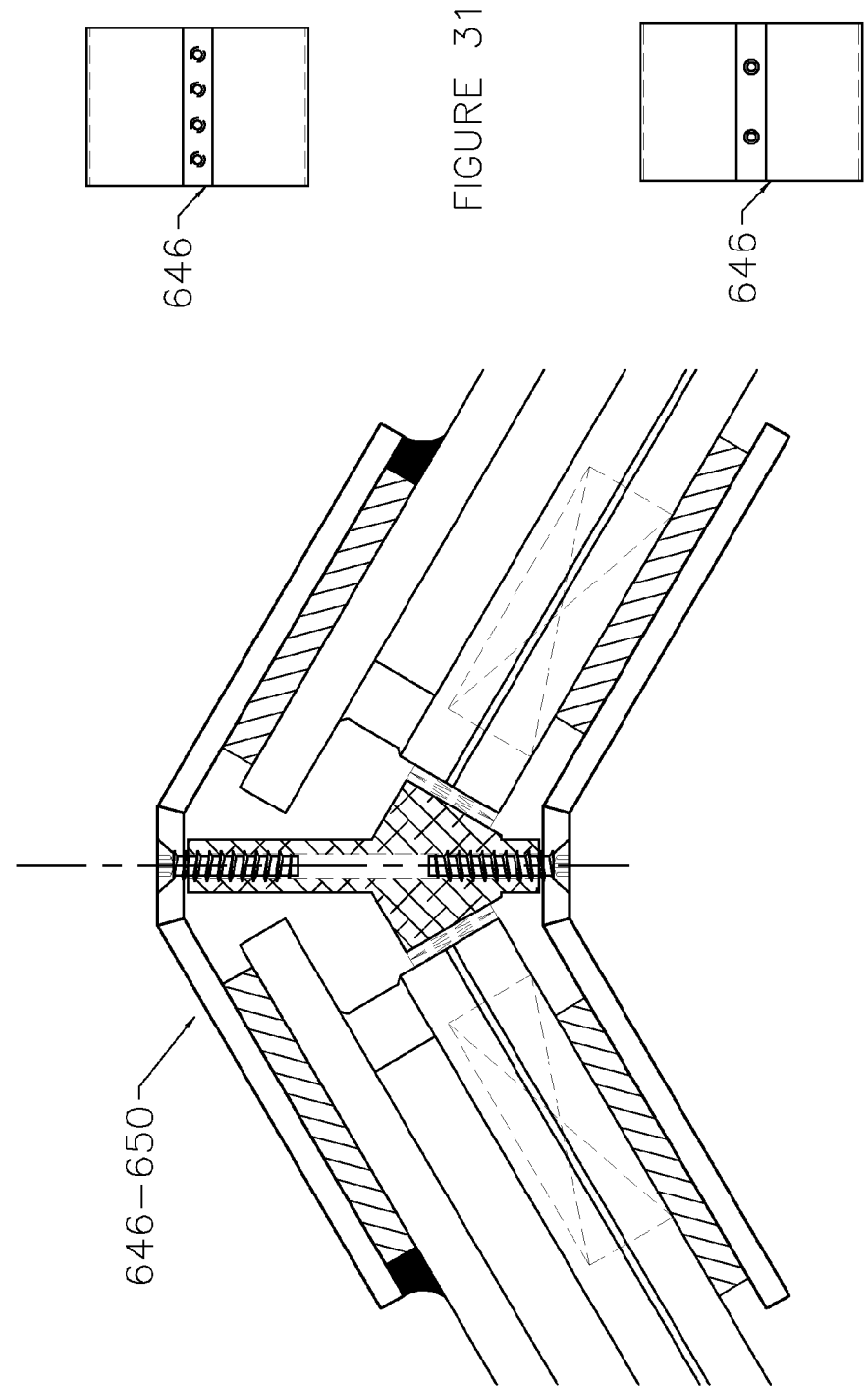

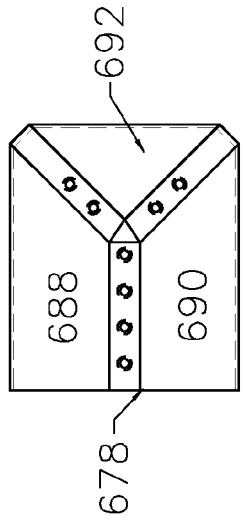
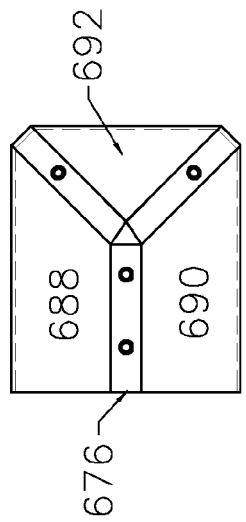
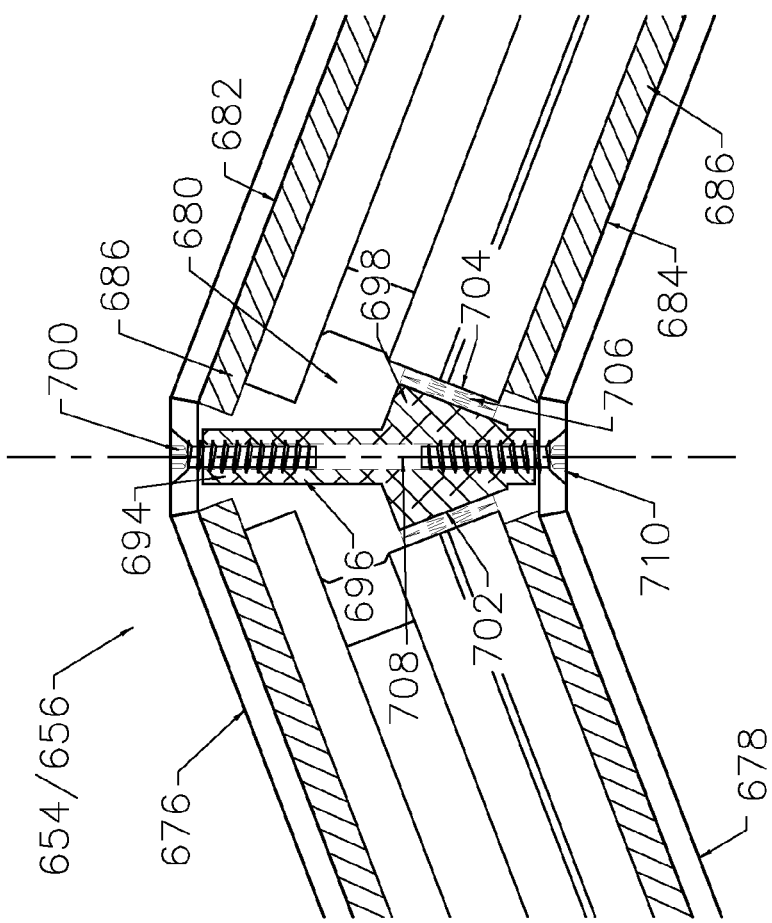
FIGURE 34
FIGURE 33
FIGURE 32

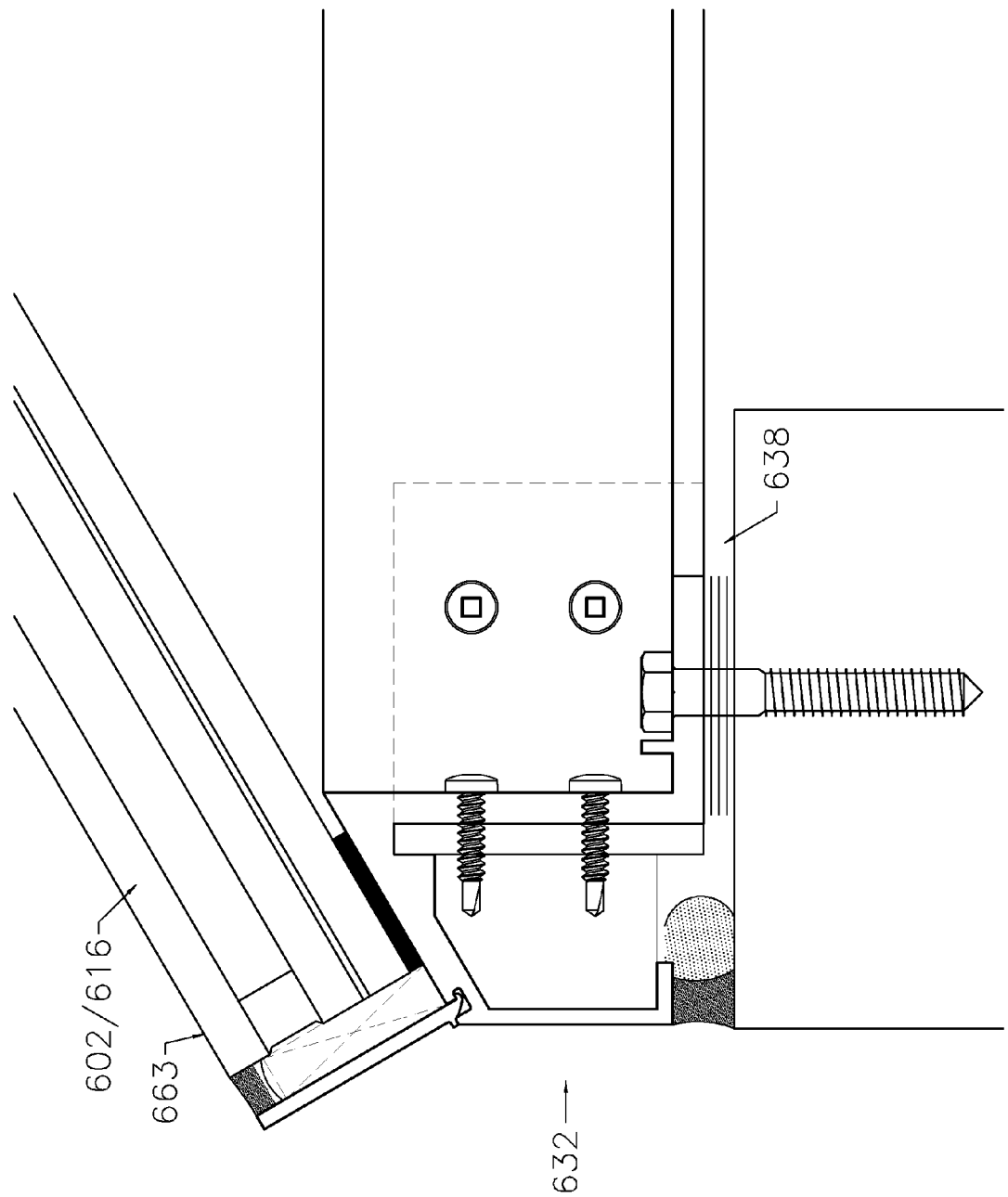

SKYLIGHT AND METHOD OF FABRICATING THE SAME

The present application is a divisional application, and claims the priority benefit, of U.S. nonprovisional patent application Ser. No. 13/833,812 filed Mar. 15, 2013, entitled "SKYLIGHT AND METHOD OF FABRICATING THE SAME" of the present applicant and with the same named inventors. The entire content of the prior application is incorporated herein by reference.

BACKGROUND OF INVENTION

1. Field of the Invention

The present invention relates to skylights and methods for making skylights. More particularly, the present invention relates to commercial skylights but is not limited to that.

2. Description of the Prior Art

For years, the commercial skylight industry has offered relatively limited options for customers in terms of materials, aesthetics and performance. Their aging design has not kept up with rapidly evolving standards for energy efficiency, green building practices, and cost controls. New standards demand maximum daylighting benefits and a contribution to the overall energy efficiency of the building. Additionally, architects continually demand greater flexibility in aesthetics, materials and simplicity of design.

Traditional skylights are typically offered with glass or acrylic panels. They range in shape from plastic bubbles, to flat "single slope" rectangles, and a range of complex shapes including pyramids, polygons and ridges, and custom shapes. Current skylight systems are relatively similar from manufacturer to manufacturer, making them difficult to differentiate. Typical construction relies on a grid of aluminum rafters, which limits viewable area, requires hundreds of parts and pieces, and reduces overall performance.

It is known in the field of skylights and other building areas where structural glass is a feature to use patch fittings as a way to secure adjacent pieces of glass together or to reinforce the perimeter or portions of the perimeter of the glass. Patch fittings comprise two pieces of metal or similar structural material joined together to sandwich the glass between them. Patch fittings that currently exist join the two metal pieces together around the glass piece with a bolt or screw and may include a gasket on the interior surfaces to space the metal from the glass. It is also known in the field of skylights that have an apex to use an apex cap to conceal the intersection where multiple pieces of glass come together. The apex cap may be metal or other material but is essentially a decorative item rather than a structural item. The apex cap may be useful to minimize moisture intrusion through the skylight. It is believed that there is no apex cover for a skylight that is also a structural member to support and/or constrain glass pieces of the skylight. In other words, there is currently no "apex patch, fitting."

What is needed is a skylight system that can be made in a variety of configurations with suitable structural integrity and minimal visual obstruction. Further, what is needed is a skylight system that is relatively easy to make and can be made with a minimum number of parts. Further, what is needed is a method of making a skylight in place and components and instructions to create such skylights.

SUMMARY OF THE INVENTION

It is an object of the present invention to provide a skylight system that can be made in a variety of configurations with suitable structural integrity and minimal visual obstruction. It is also an object to provide a skylight system that is relatively easy to install and can be assembled with a minimum number of parts. It is another object of the present invention to provide a method of making a skylight in place and components and instructions to create such skylights.

These and other objects are achieved with the present invention, which is a skylight system including a support frame at the base only, a setting chair, an apex patch fitting and a plurality of structural glass pieces fitted to the support frame and spaced from one another by a sealing interface. The apex patch fitting and the support frame provide support for the glass pieces and are configured, along with the sealing interface, to seal the edges of the glass pieces against moisture and thermal infiltration through the skylight. The invention is also, more generally, a skylight with one or more apex patch fittings. It is believed that prior to the present invention, the apex of any skylight may have been covered simply with a decorative apex cap to conceal the intersecting framing members and provide a moisture barrier. The use of an apex patch fitting has not been provided prior to the present invention. Further, it is an apex patch fitting configured as described herein, whether a skylight or other glass structure having such an apex patch fitting includes the support frame or the sealing interface described herein.

An embodiment of the skylight system invention is a skylight including a support frame at the base only having N sides, wherein each side includes a glass support sill, N pieces of glass, wherein each piece includes a base and a peak, wherein the base of each piece of glass is positioned on respective ones of the glass support sills of the sides of the support frame, and an apex patch fitting including N slots, wherein each slot is configured to receive and retain therein respective ones of the peaks of each of the pieces of glass, wherein the apex patch fitting and the support frame support the pieces of glass. The skylight may also include N ridge sealing components configured to fit between adjacent ones of the pieces of glass when the pieces of glass are positioned on the support frame and in the apex patch fitting. The use of the apex patch fitting designed as described herein reduces the need to make large, wide support frames beneath the glass that impede the view from under the skylight. The ridge sealing components include a flexible backer rod configured to fit between adjacent pieces of glass between upper and lower members thereof.

The glass pieces have an upper surface and a lower surface. The lower surface may include an extension so that when two pieces of glass are adjacent to one another, a spacing between the lower surfaces is approximately equal to the spacing between the upper surfaces. The apex patch fitting includes an upper body, a lower body and a positioning key that joins together the upper body and the lower body. The positioning key spaces the upper body from the lower body. The upper body and the lower body extend to cover an upper space and a lower space between adjacent pieces of glass. The skylight includes a plurality of setting chairs corresponding in number to the number of glass pieces and arranged to space the base of each piece of glass from its respective glass support sill.

The skylight of the present invention may be formed in a variety of shapes, including pyramidal, polygonal, ridge and hipped ridge. A single slope skylight may also be made with the present invention. The ridge and hipped ridge may be of selectable length. Multiple apex patch fittings and apex patch fittings that account for different peak interfaces are provided with the present invention.

The skylights of the present invention may be fabricated and assembled with great ease using the base support frame and apex patch fitting described herein, as well as an apex patch fitting support tool that facilitates glass placement on the support frame and into the apex patch fitting. The support frame and apex patch fitting designs, as well as glass interface sealing components, ensure a high quality skylight of selectable dimensions and effective thermal and moisture intrusion prevention. Visibility through the skylight is maximized with the present invention. These and other features and advantages of the present invention will be understood upon review of the following detailed description, the accompanying drawings and the appended claims.

BRIEF DESCRIPTION OF THE DRAWINGS

FIG. 3 is a perspective view of the apex patch fitting of the present invention in position at the peak of the skylight of FIG. 1.

FIG. 4 is a top plan view of the apex patch fitting for the skylight of FIG. 1.

FIG. 5 is a bottom plan view of the apex patch fitting for the skylight of FIG. 1.

FIG. 6 is a side view of the sill for the skylight of FIG. 1 at the corner thereof and showing the sill partially in cross section.

FIG. 17 is a perspective view of a third embodiment of the skylight of the present invention in a ridge configuration.

FIG. 29 is a cross sectional side view of a first apex patch fitting for the skylight of FIG. 27.

FIG. 30 is a top plan view of the first apex patch fitting for the skylight of FIG. 27.

FIG. 31 is a bottom plan view of the first apex patch fitting for the skylight of FIG. 27.

FIG. 32 is a cross sectional side view of a second apex patch fitting for the skylight of FIG. 27.

FIG. 33 is a top plan view of the second apex patch fitting for the skylight of FIG. 27.

FIG. 34 is a bottom plan view of the second apex patch fitting for the skylight of FIG. 27.

FIG. 35 is a cross sectional side view of the sill for the skylight of FIG. 27 at the corner thereof and partially in cross section.

DETAILED DESCRIPTIONS OF SEVERAL EMBODIMENTS OF THE INVENTION

Figure 1:
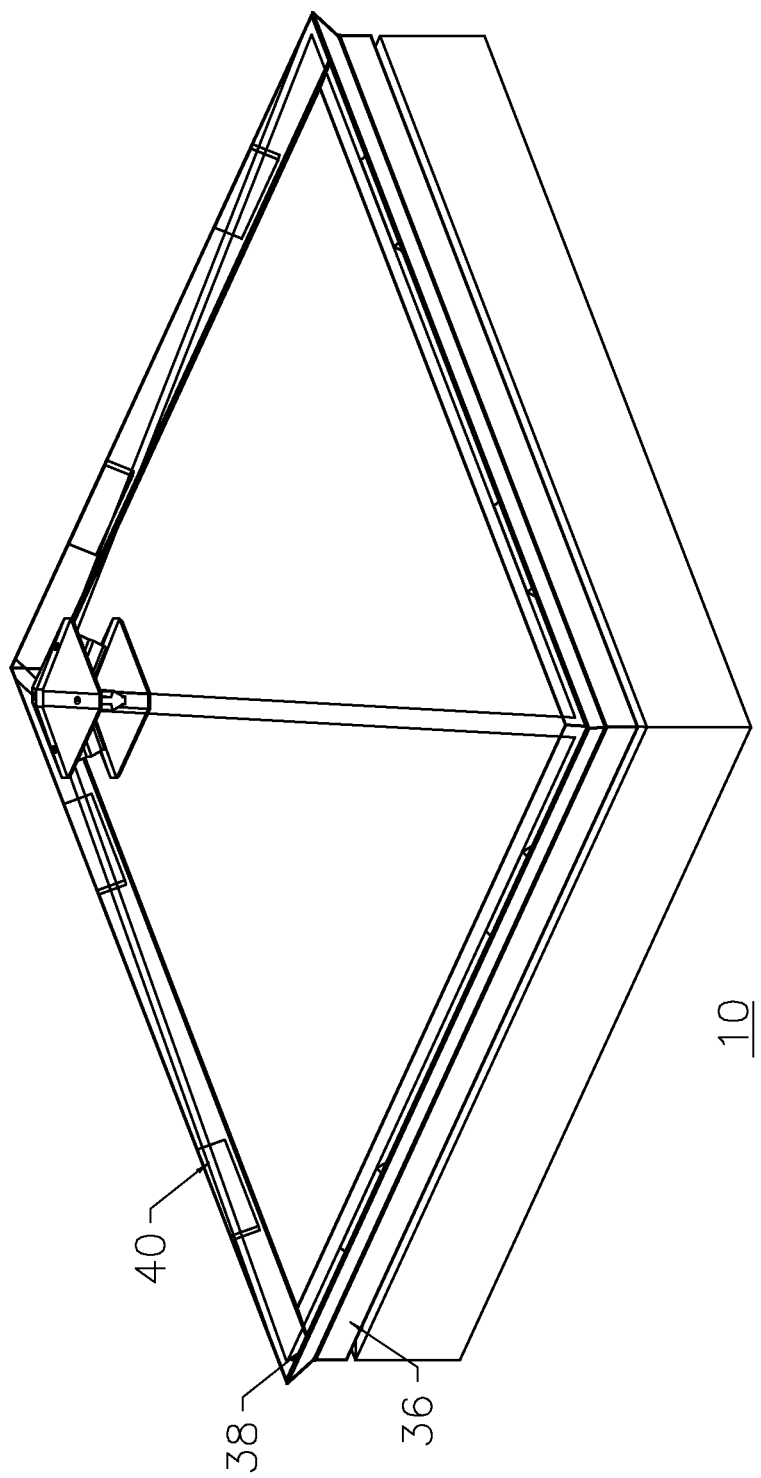
FIG. 1 is a top perspective view of a first embodiment of the skylight of the present invention in a pyramid configuration.
Figure 2:
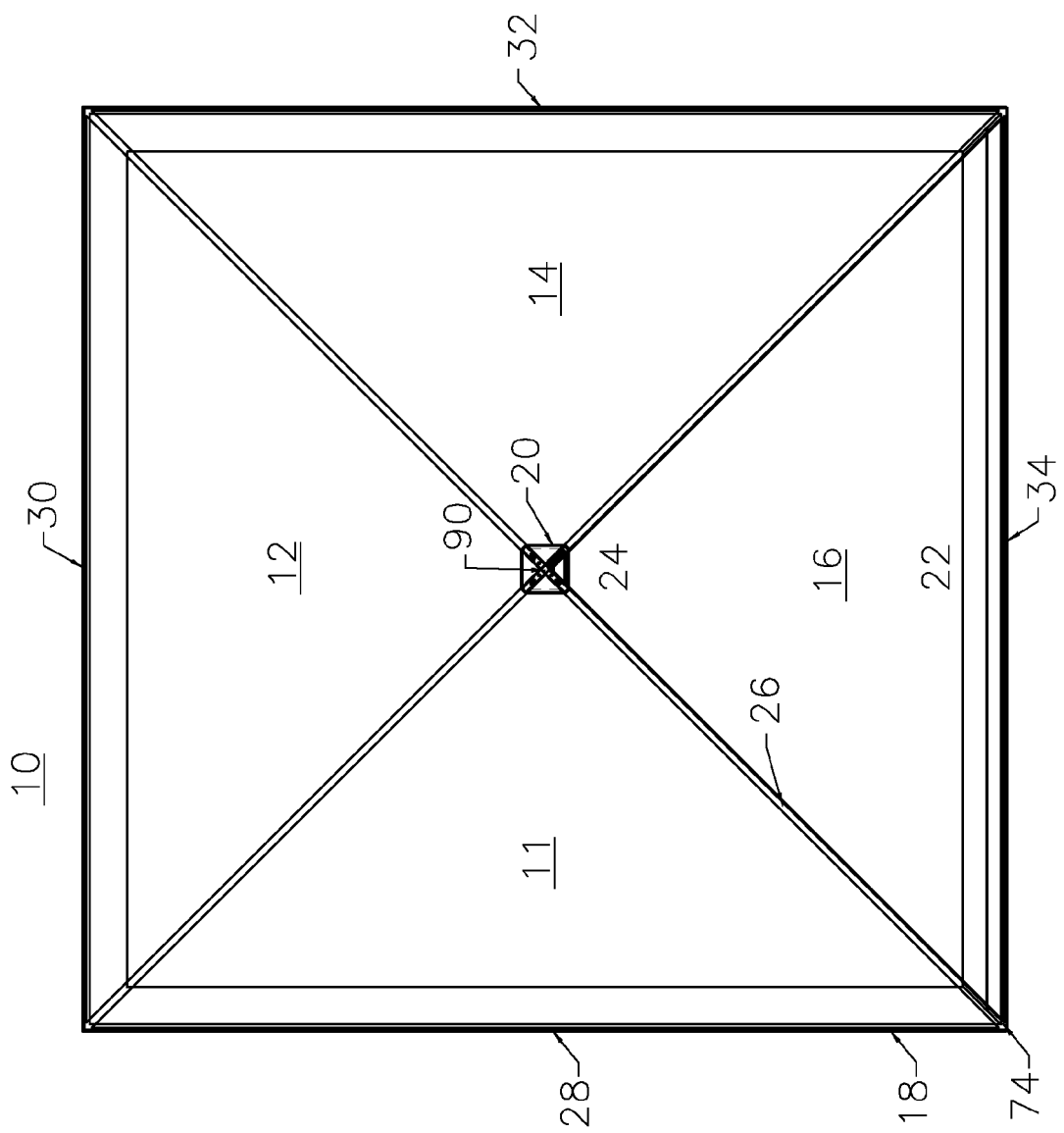
FIG. 2 is a top plan view of the skylight of FIG. 1.
Figure 7:
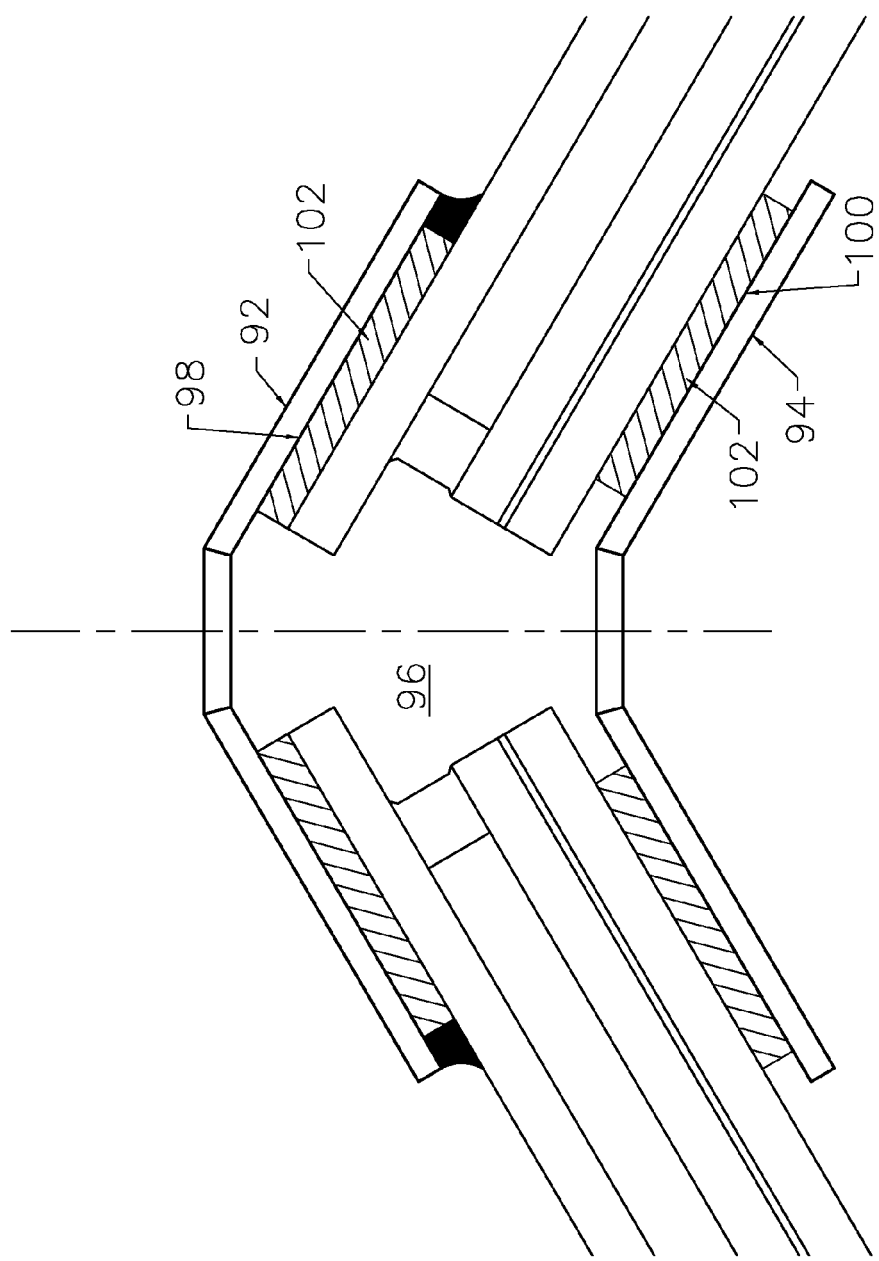
FIG. 7 is a first cross sectional side view of the apex patch fitting for the skylight of FIG. 1.

A first embodiment of a skylight system 10 of the present invention is shown in FIGS. 1-10. A second embodiment of a skylight system 200 of the present invention is shown in FIGS. 11-16. A third embodiment of a skylight system 400 of the present invention is shown in FIGS. 17-26. A fourth embodiment of a skylight system 600 of the present invention is shown in FIGS. 27-37. All of the embodiments of the skylight system represent substantial improvements over existing skylight systems in that they provide greater flexibility, good thermal and moisture isolation and ease of fabrication and assembly. The four skylight systems represent four different skylight shapes. The first skylight system 10 forms a skylight of pyramid shape. The second skylight system 200 forms a skylight of polygon shape (8-sided in the particular version described herein but not limited to that specific number of sides). The third skylight system 400 forms a skylight of ridge shape. The fourth skylight system 600 forms a skylight of hipped ridge shape.

The pyramid-shaped skylight formed of the skylight system 10 represented in FIGS. 1-10 includes four pieces of glass 11, 12, 14 and 16 retained on a support frame 18. The glass pieces 11-16 are further retained together in an angled position with respect to the support frame 18 with an apex patch fitting 20. Each of the glass pieces 11-16 is of substantially the same dimensions. They are triangular in shape, including a base 22 and a peak 24. Each piece forms one quarter of the coverage of the skylight. The base 22 of each piece of glass is set on and retained to the support frame 18 and the peak 24 of each piece of glass is set in and retained to the apex patch fitting 20. Each piece of glass is spaced from an adjacent piece of glass by a hip sealing component 26. The pieces of glass 11-16 are sized to create the skylight of desired size.

The support frame 18 is a square including four sections 28, 30, 32 and 34, wherein, each section 28-34 supports an individual one of the glass pieces 11-16. Each of the four sections 28-34 includes a sill member 36, a setting chair 38, and one or more setting blocks 40. These components of the four sections 28-34 are separable but one or more may be part of a unitary structure. The sill member 36 is a shaped piece that may be fabricated of Aluminum or other material suitable to withstand an outside environment for a long period of time. Each sill member 36 has a length that is slightly more than the length of the base 22 of one of the glass pieces 11-16. The sill member 36 includes a first leg 42, a second leg 44, a third leg 46 and a fourth leg 48. The first leg 42 is configured to rest on an underlying surface 50 where the skylight is to be installed. The first leg 42 includes a condensate trap flange 52 to establish a condensation evaporation channel 54. A sill attachment element, such as a threaded bolt 56, is used to fixedly attach the sill member 36 to the underlying surface 50.

The second leg 44 of the sill member 36 extends upwardly at a right angle from end 58 of the first leg 42. The second leg 44 has an angled upper section 60 that extends to the third leg 46. The third leg 46 extends downwardly from the upper section 60 of the second leg 44 and terminates at a chair retaining region 62. The chair retaining region 62 includes a chair support slot 64 that includes an inlet section 66 and a retaining shoulder 68 with an underlying retaining space 70, the combination of which provides a retainer for setting the position of the setting chair 38. A glass piece of the glass pieces 11-16 of the skylight is set on surface 72 of the third leg 46.

The fourth leg 48 extends downwardly from the chair retaining region 62 of the third leg 46. The fourth leg 48 terminates with an insulation support flange 67, which also acts as a sealing surface. The fourth leg 48 is substantially parallel to the second leg 42 but it is shorter than the second leg 42. When the sill member 36 is in position on the surface 50, the fourth leg 48 does not contact the surface 50. The difference in the height of the fourth leg 48 at the chair retaining region 62 and the second leg 44 at the upper section 60 defines the angle of the glass piece when in position on the surface 72 of the third leg 46 with respect to the underlying surface 50. In the version of the pyramid-shaped skylight represented in FIGS. 1-10, that angle is about 30°. Other angles are possible and may be established by the height difference between the second leg 44 and the fourth leg 48. Space 65 between the second leg 44 and the fourth leg 48 may be filled with insulation if desired.

The system 10 further includes for each of the four corners of the skylight a substantially right angle corner key 74. The corner key 74 is a bar that when placed at an interface of adjacent ones of the sections 28-34 sets the corner and joins those sections together with attachment elements such as threaded bolts 76. The corner key 74 is configured to fit into corner key slot 78 located at underside 80 of third leg 46 adjacent to second leg 44. Each leg of the corner key 74 extends about three inches along the length of adjacent ones of sections 28-34 but is not limited thereto.

The setting chair 38 is a substantially flat bar that includes a base 82 extending its entire length. The setting chair 38 has a length substantially the same as the sill member 36. The base 82 includes a retaining flange 84 and a retaining nose 86. When the setting chair 38 is set in position on the sill member 36, the retaining nose 86 extends into the inlet section 66 under the retaining shoulder 68 and into the retaining space 70 of the third leg 46 of the sill member 36. At that time, the retaining flange 84 rests on the edge of the interface of the third leg 46 and the fourth leg 48 of the sill member 36.

The setting chair 38 establishes the perimeter and support for the base 22 of the glass piece. The base 22 is separated from the setting chair 38 by one or more setting blocks 40 that are positioned in space 88. The setting blocks 40 may extend substantially the entire length of the setting chair 38 or it may be established by a plurality of pieces that are spaced from one another along the length ox the setting chair 38. The base 22 of the glass piece may be joined to the sill member 36 with structural glazing tape or structural silicone, for example.

The base 22 of each of the glass pieces 11-16 rests on the setting blocks 40 and each of the pieces extends to an apex 90 where the peaks 24 of each glass piece 11-16 are retained together with the apex patch fitting 20. The apex patch fitting 20 includes an outer patch member 92 and an inner patch member 94 establishing a patch space 96 therebetween. An underside 98 of the outer patch member 92 and an upper side 100 of the inner patch member 94 includes an apex patch fitting gasket 102 affixed thereto. The distance between the gasket 102 of the outer patch member 92 and the gasket 102 of the inner patch member 94 is determined by the thickness of the glass pieces 11-16. The apex patch tiding members 92 and 94 are joined together with joining members such as threaded bolts 104 that are located between adjacent pieces of glass 11-16.

Figure 8:
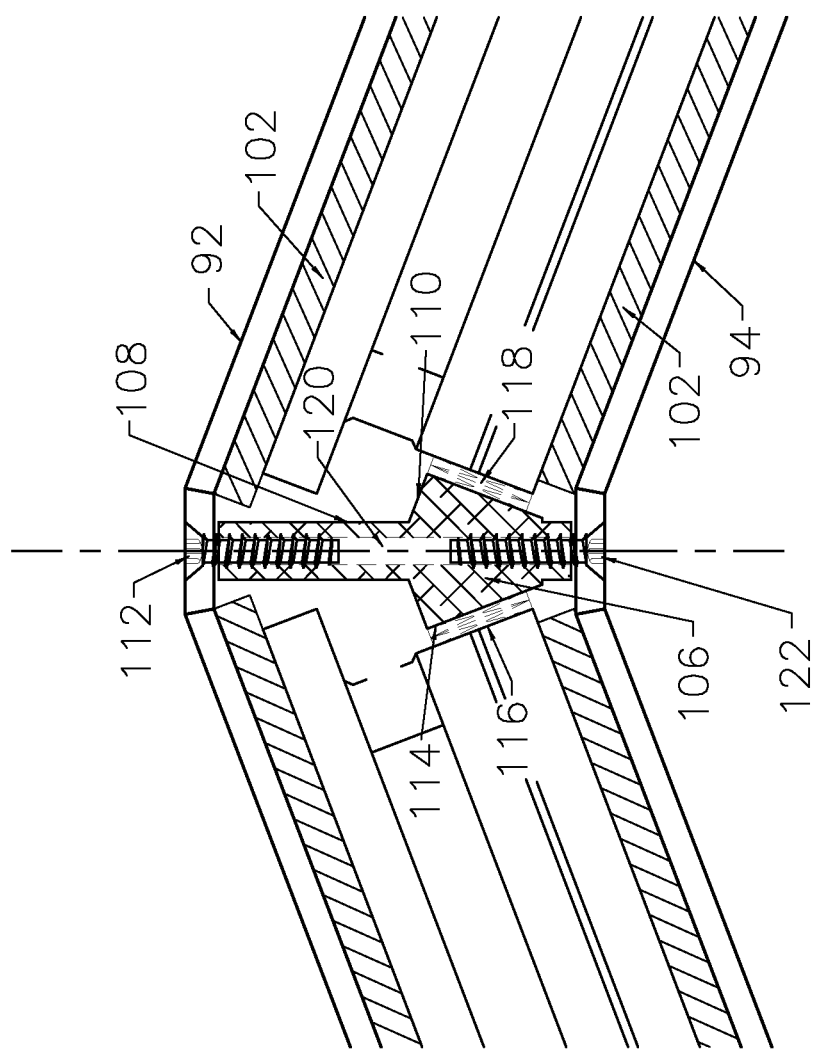
FIG. 8 is a second cross sectional side view of the apex patch fitting for the skylight of FIG. 1.
Figure 9:
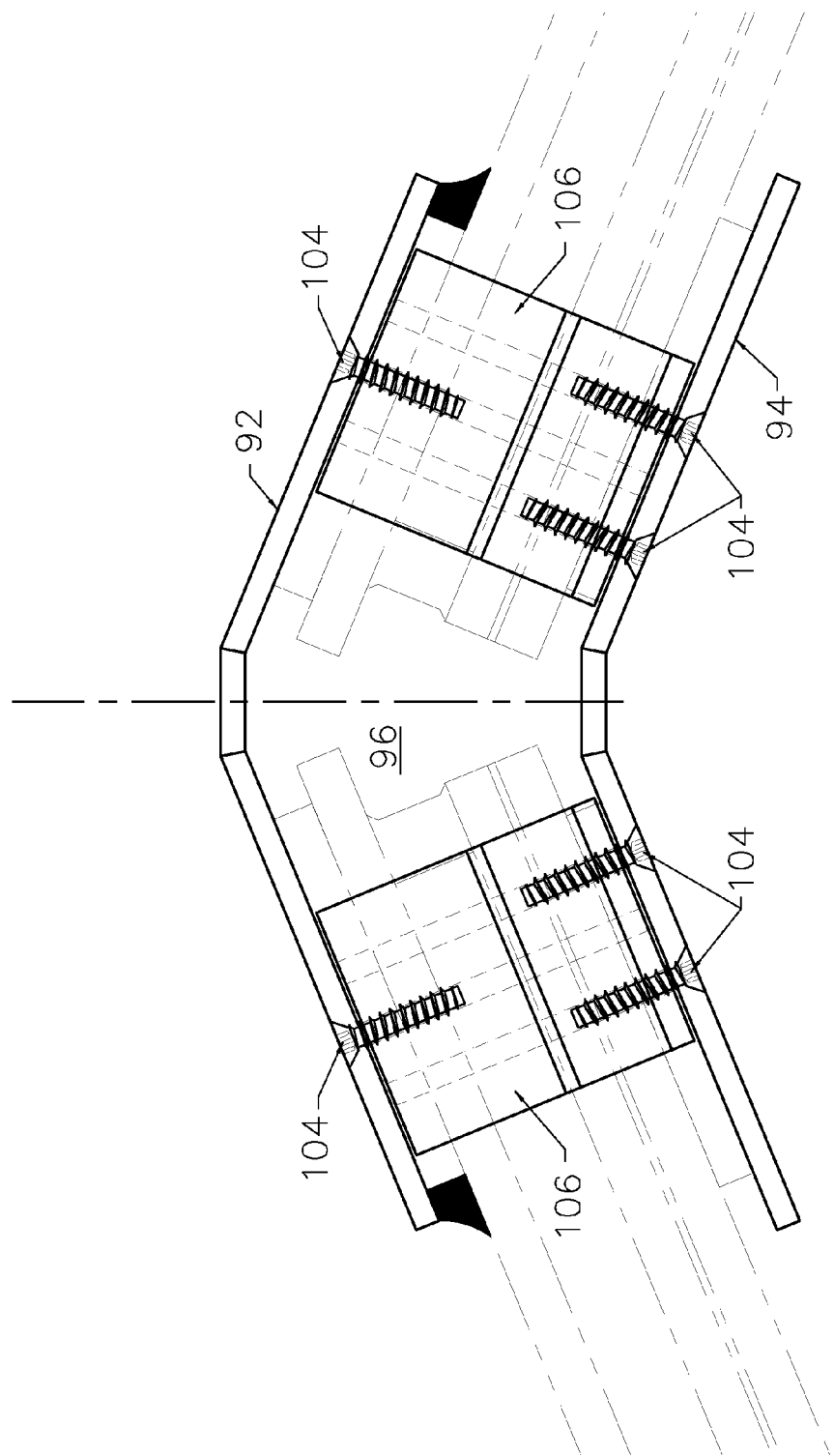
FIG. 9 is a third cross sectional side view of the apex patch fitting for the skylight of FIG. 1.
Figure 10:
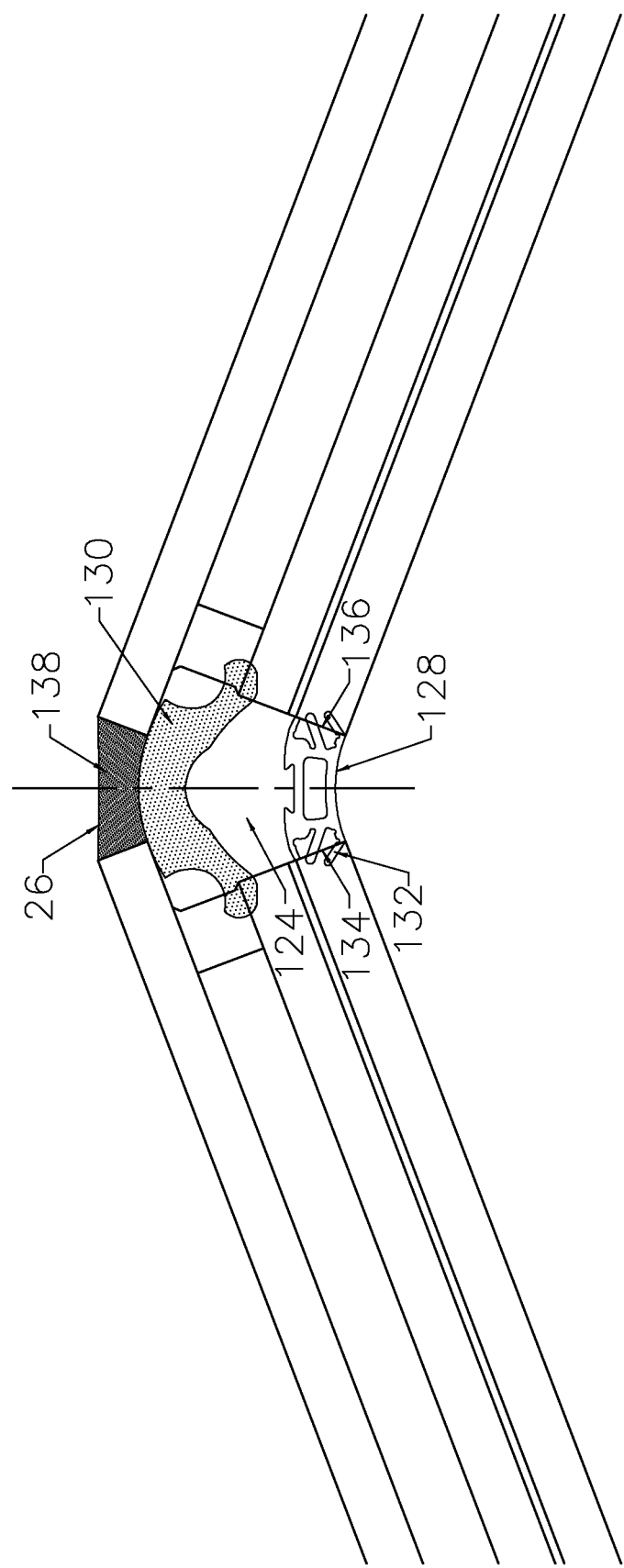
FIG. 10 is a cross sectional side view of an interface between two pieces of glass showing the hip sealing component for the skylight of FIG. 1.
Figure 11:
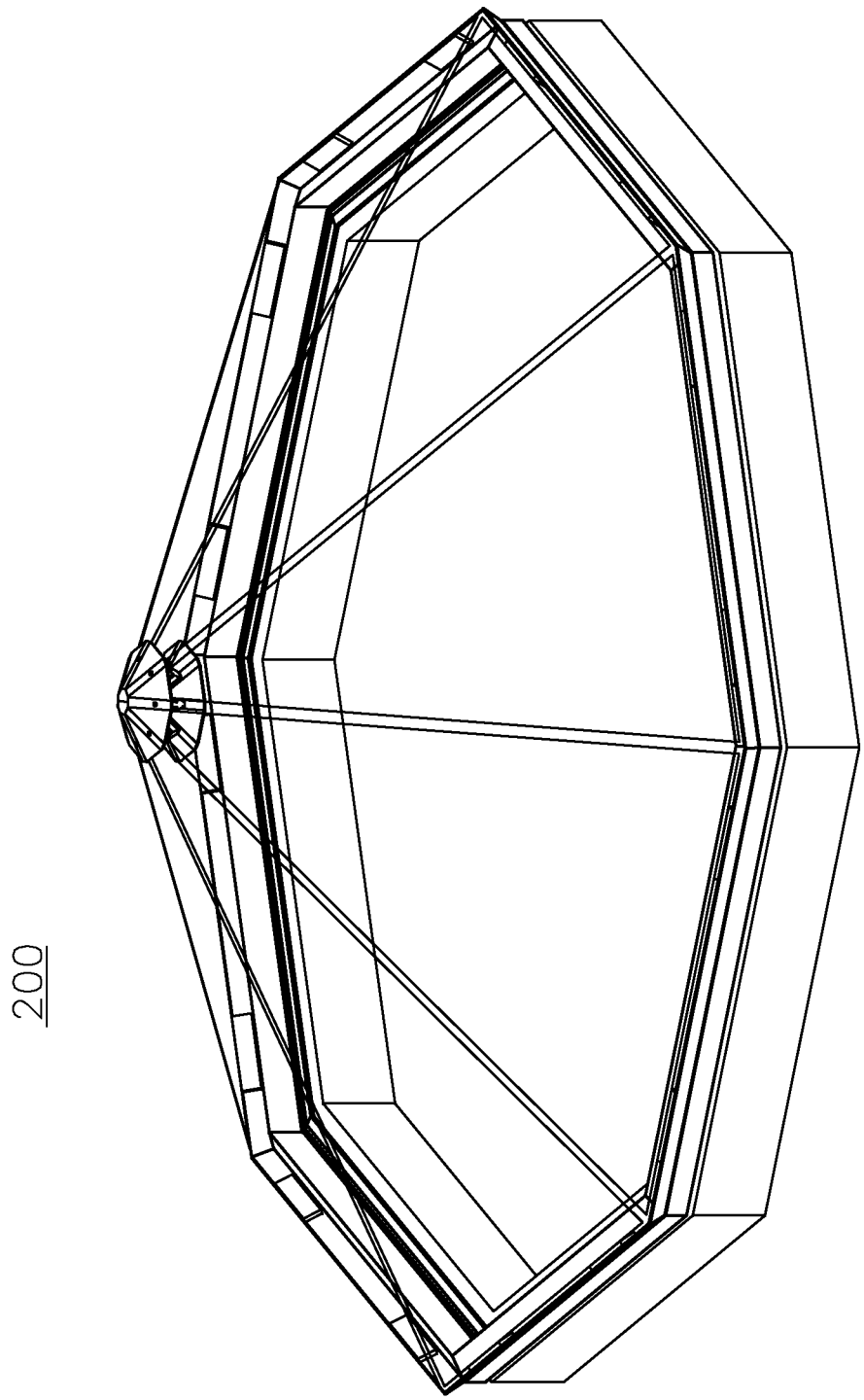
FIG. 11 is a perspective view of a second embodiment of the skylight of the present invention in a polygon configuration.
Figure 12:
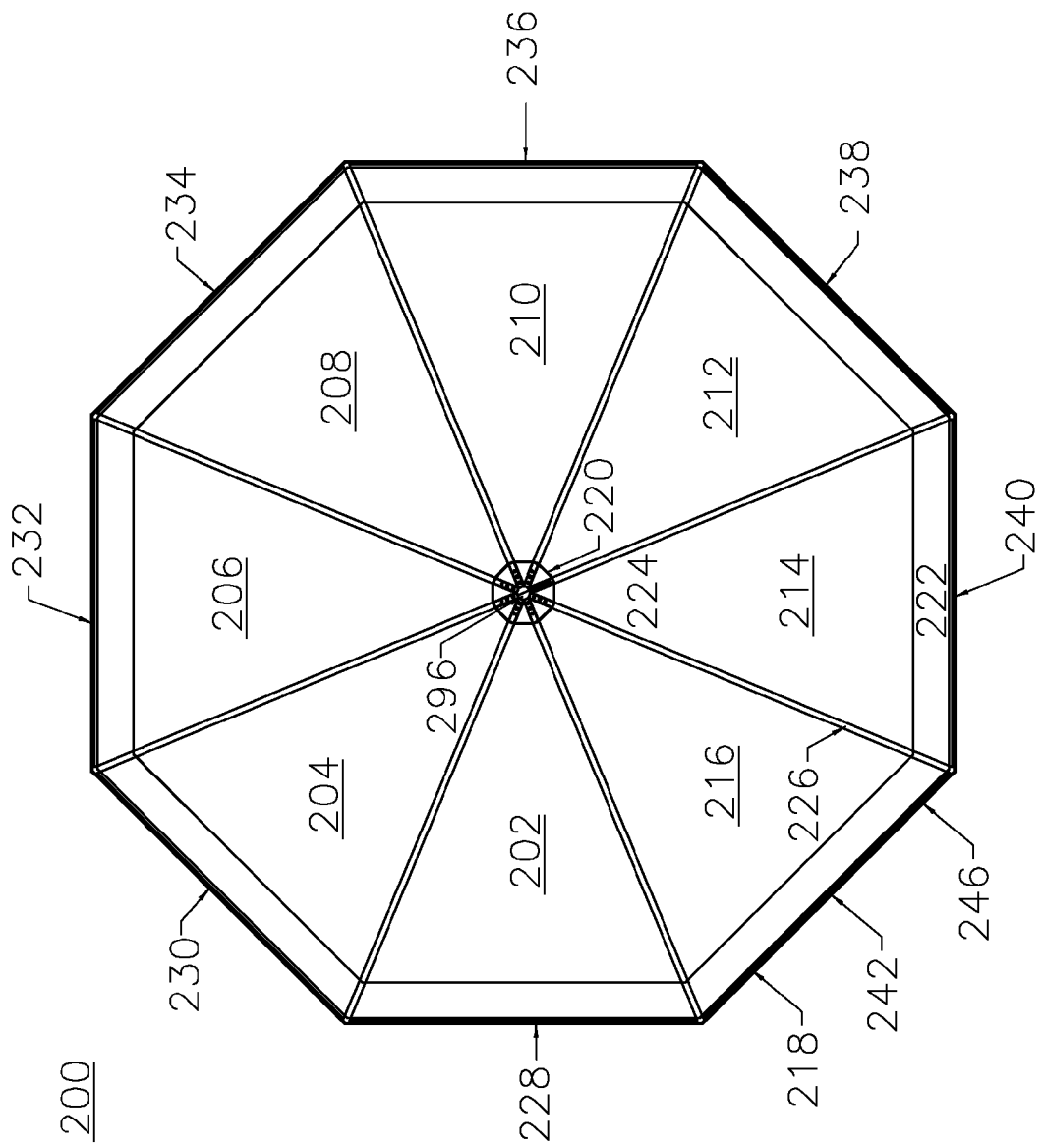
FIG. 12 is a top plan view of the skylight of FIG. 11.
Figure 13:
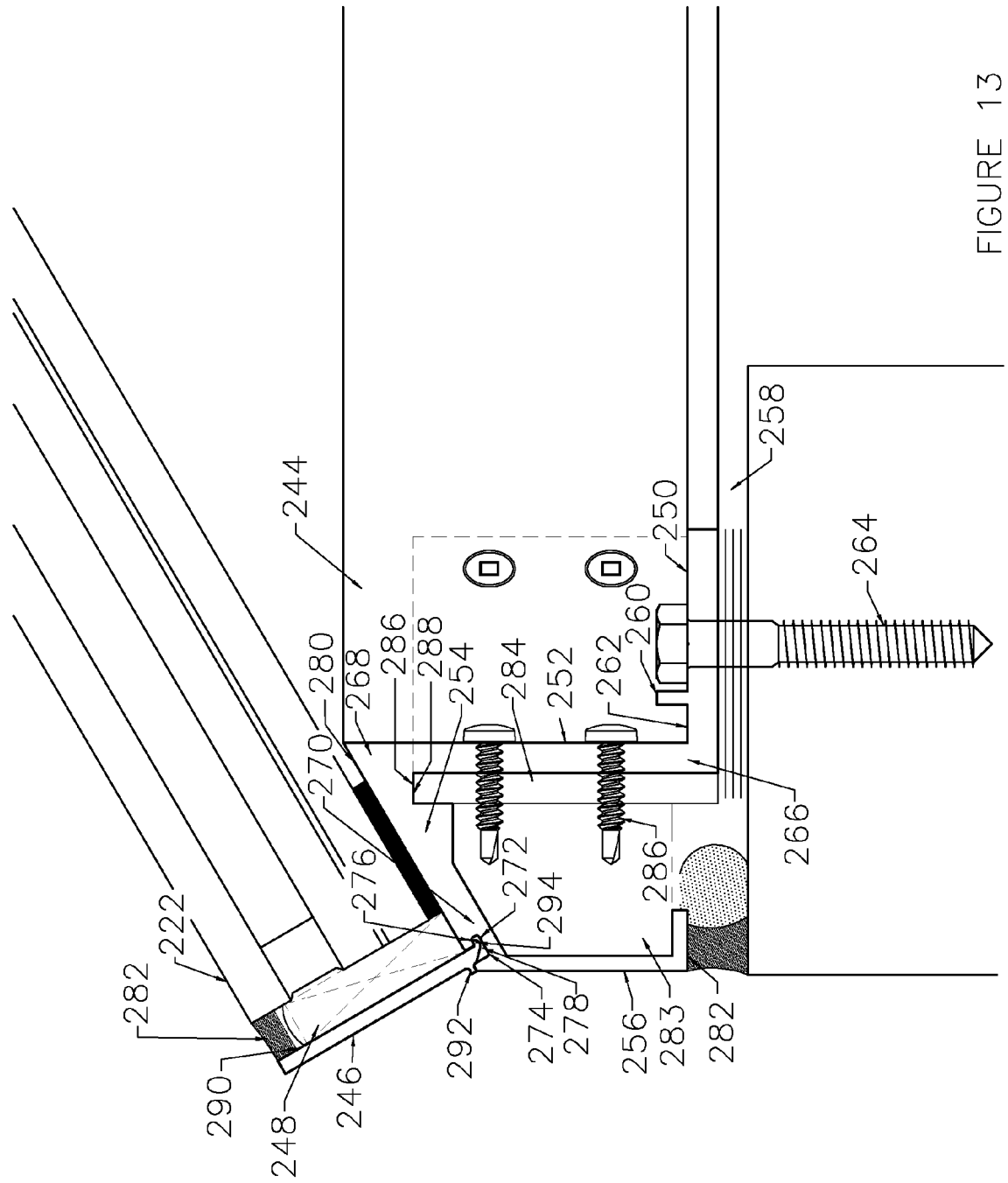
FIG. 13 is a cross sectional side view of the sill of the skylight of FIG. 11 at the corner thereof and partially in cross section.
Figure 15:
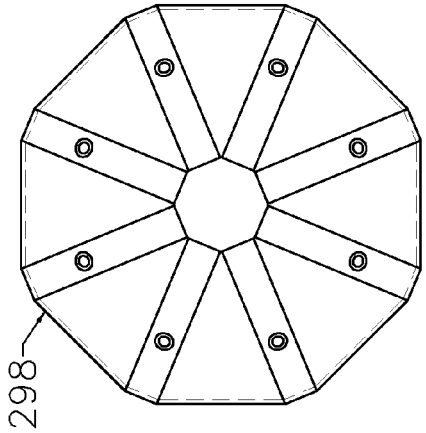
FIG. 15 is a top plan view of the apex patch fitting for the skylight of FIG. 11.
Figure 16:
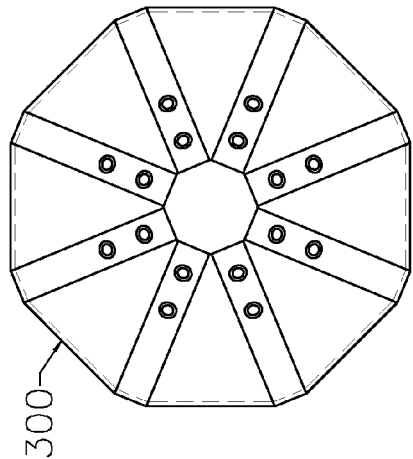
FIG. 16 is a bottom plan view of the apex patch fitting for the skylight of FIG. 11.
Figure 14:
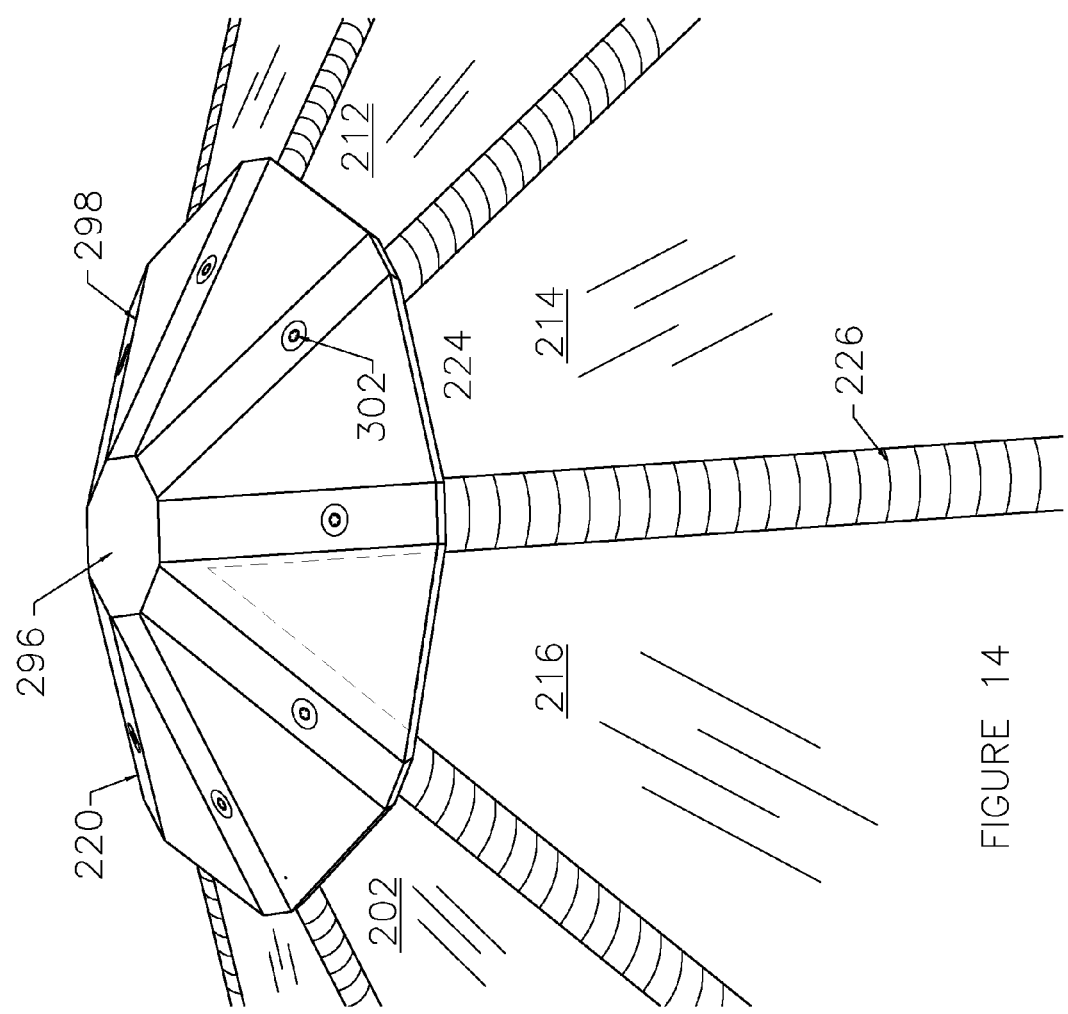
FIG. 14 is a perspective view of the apex patch fitting for the skylight of FIG. 11.
Figure 18:
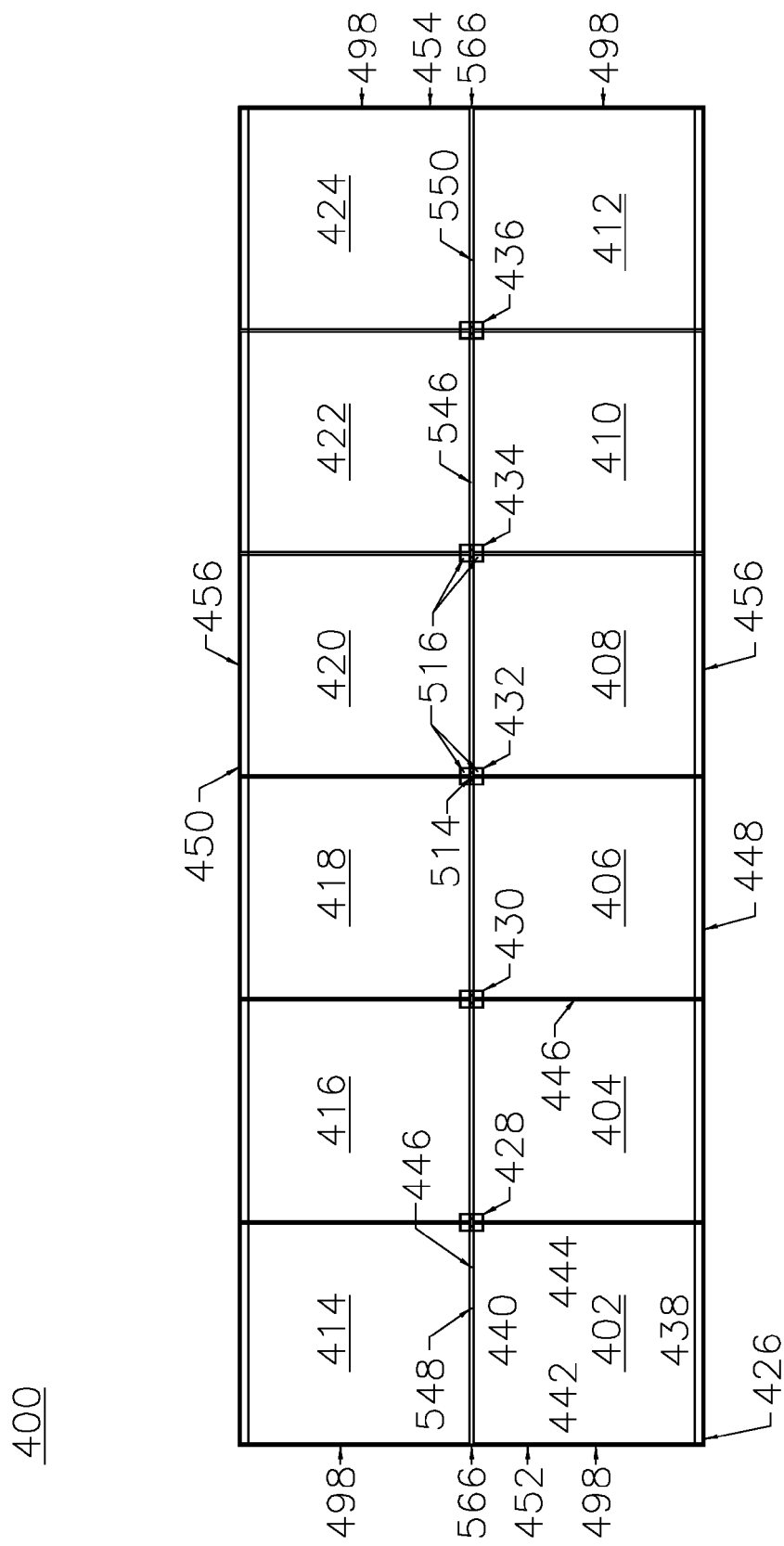
FIG. 18 is a top plan view of the skylight of FIG. 17.
Figure 21:
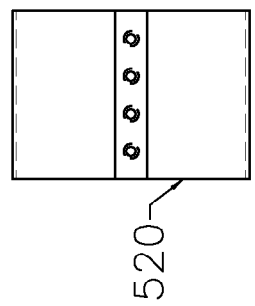
FIG. 21 is a bottom plan view of the apex patch fitting for the skylight of FIG. 17.
Figure 20:
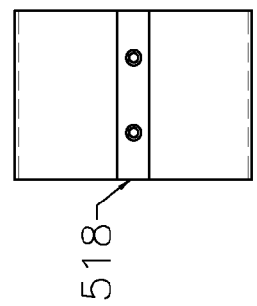
FIG. 20 is a top plan view of the apex patch fitting for the skylight of FIG. 17.
Figure 19:
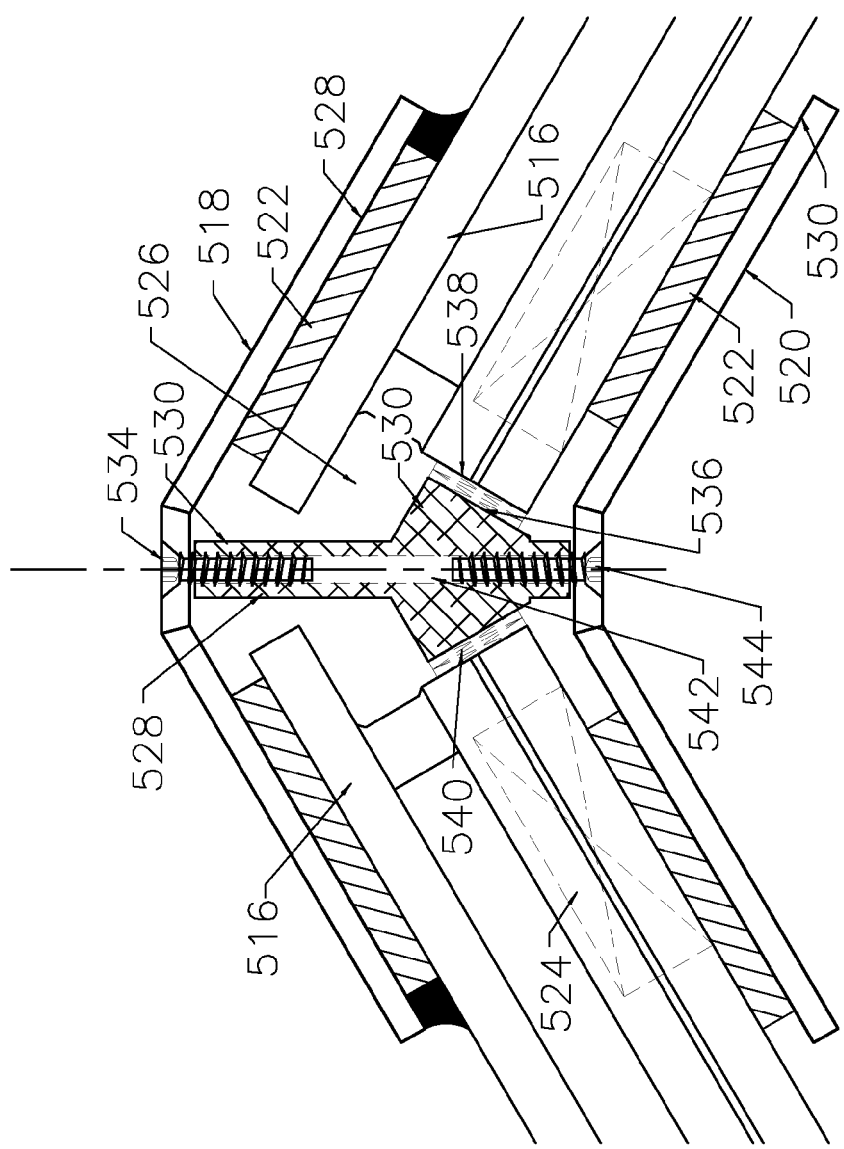
FIG. 19 is a cross sectional side view of the apex patch fitting for the skylight of FIG. 17.
Figure 22:
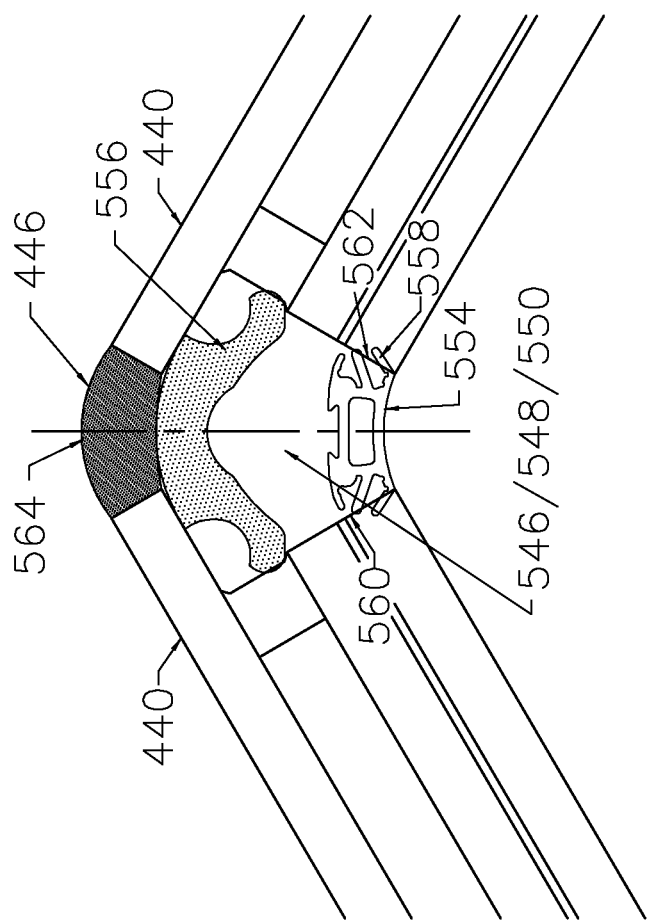
FIG. 22 is a cross sectional side view of an interface between two pieces of glass of the skylight of FIG. 17 at the ridge showing the ridge sealing component.
Figure 23:
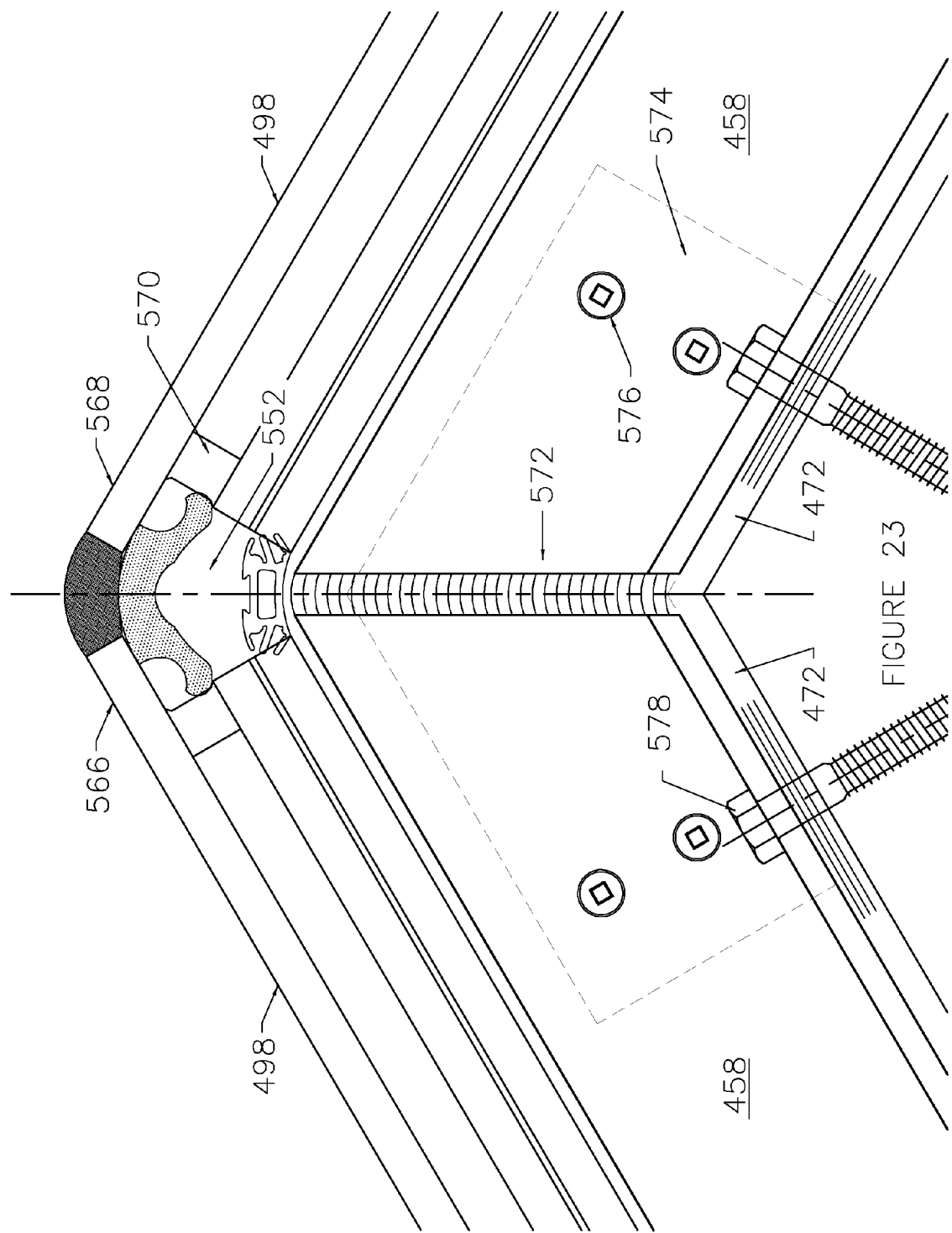
FIG. 23 is a cross sectional side view of the end sill apex for the skylight of FIG. 17.
Figure 24:
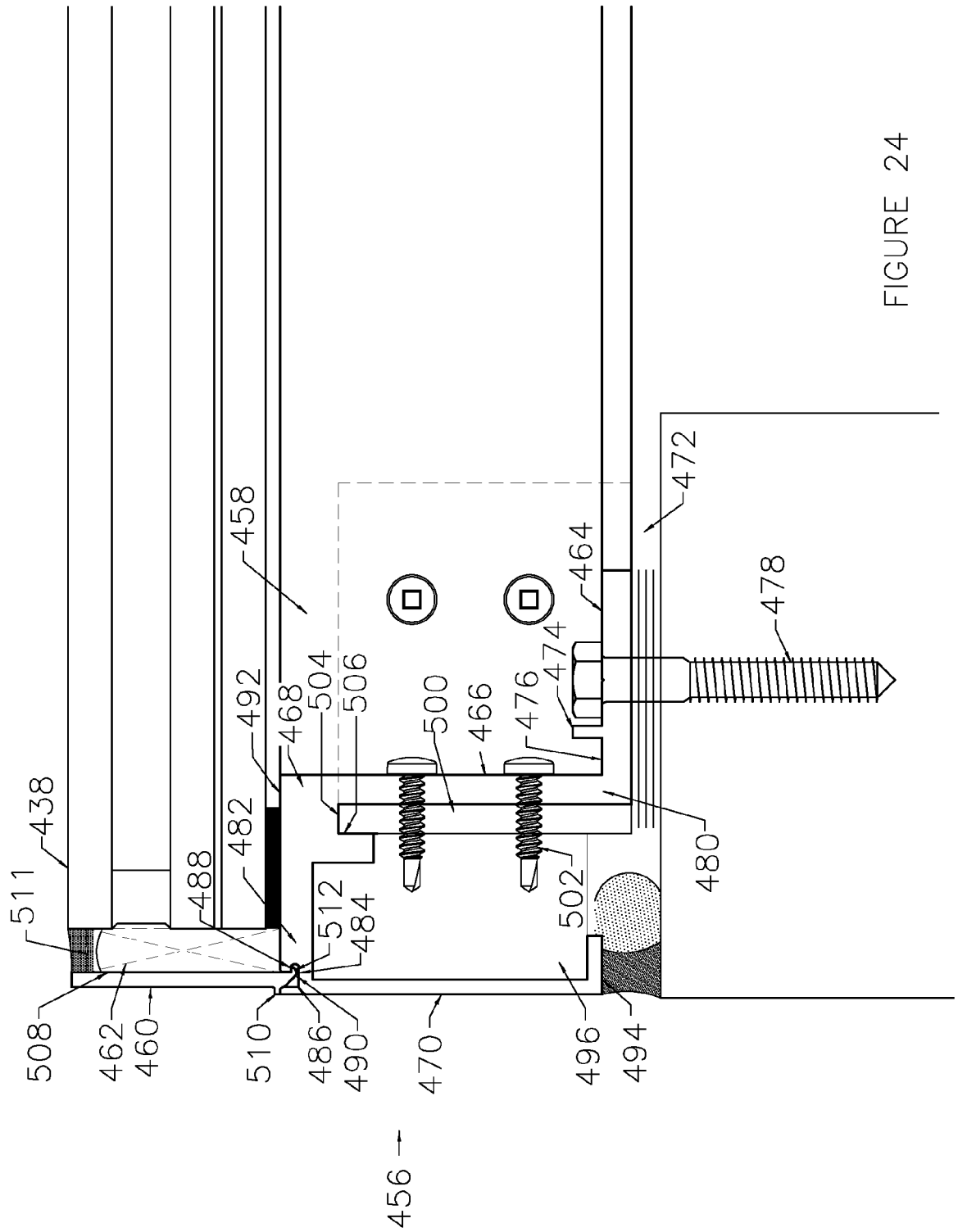
FIG. 24 is a cross sectional side view of the sill for the skylight of FIG. 17 at the corner thereof and partially in cross section.
Figure 25:
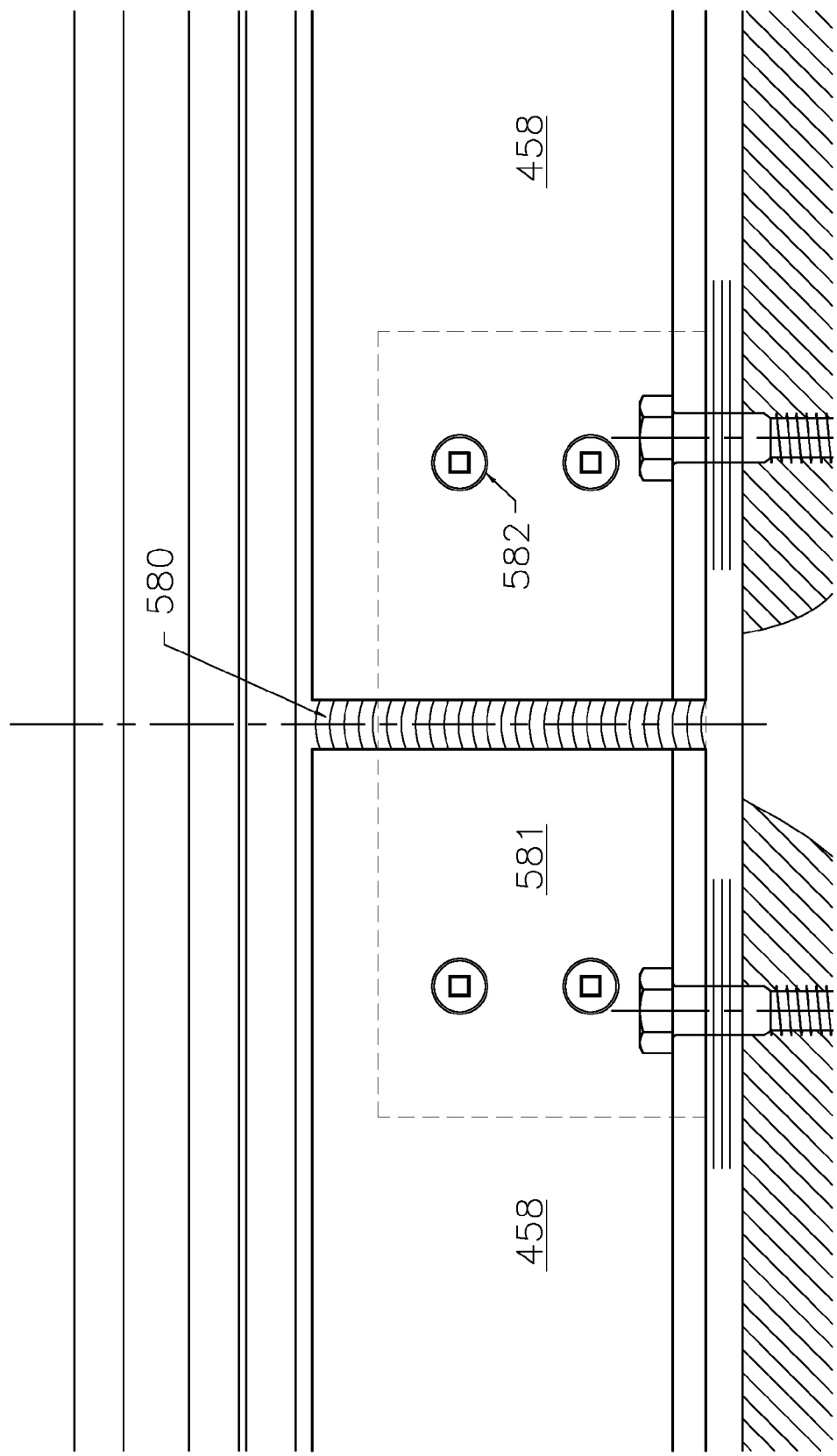
FIG. 25 is a cross sectional side view of the sill splice for the skylight of FIG. 17.
Figure 26:
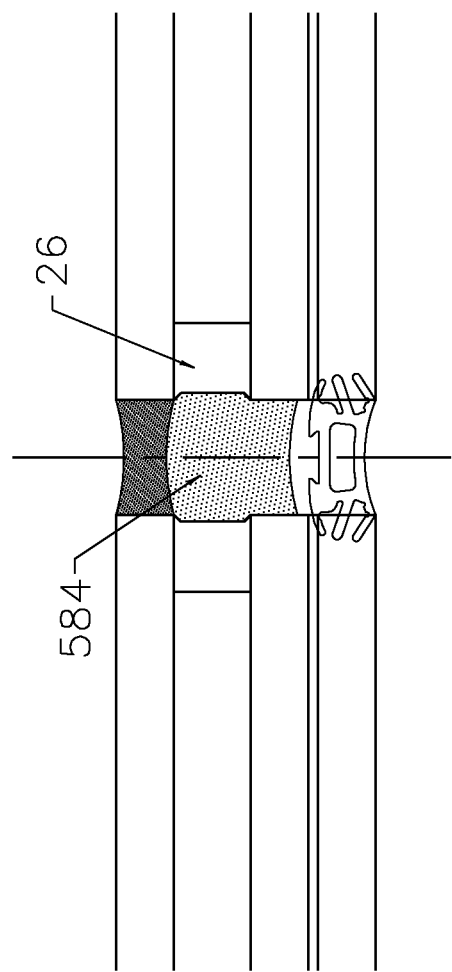
FIG. 26 is a cross sectional side view of the butt joint for the skylight of FIG. 17.
Figure 27:
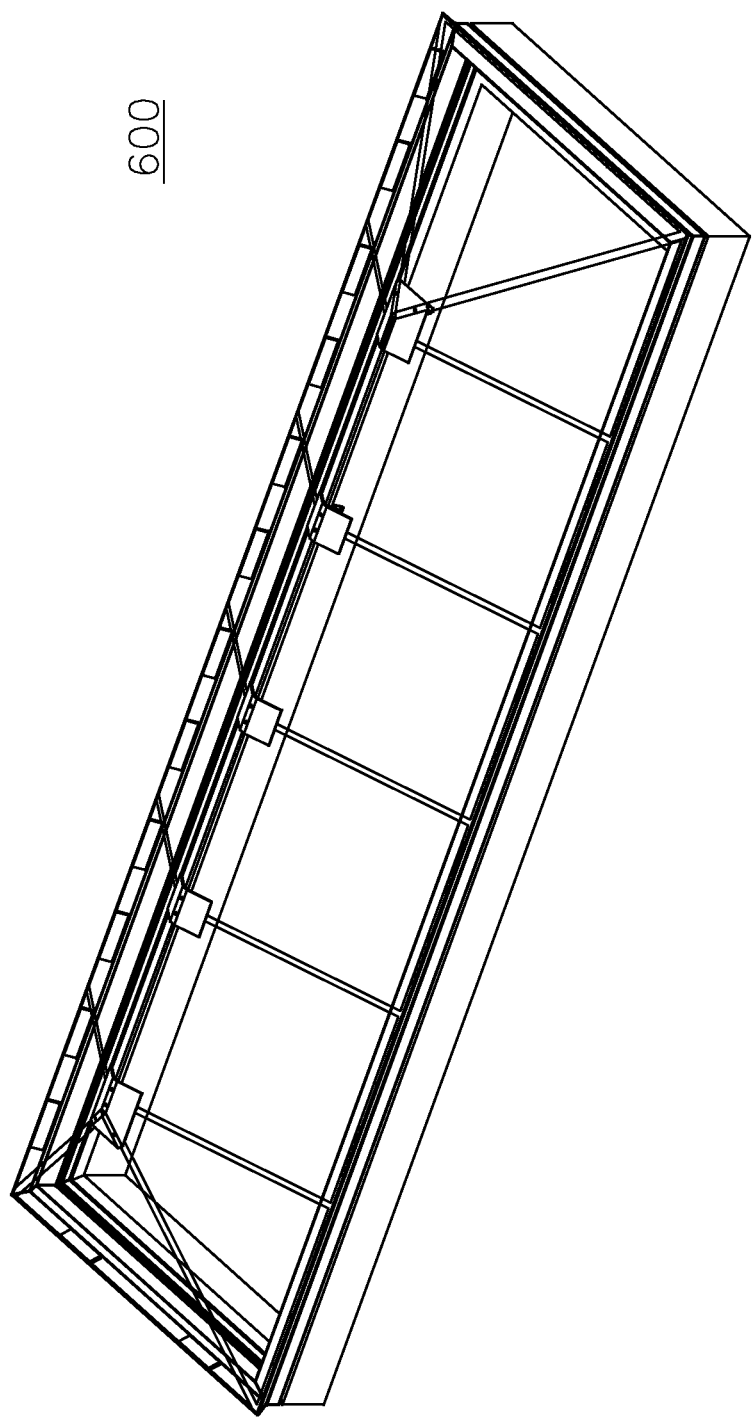
FIG. 27 is a perspective view of a fourth embodiment of the skylight of the present invention in a hipped ridge configuration.
Figure 28:
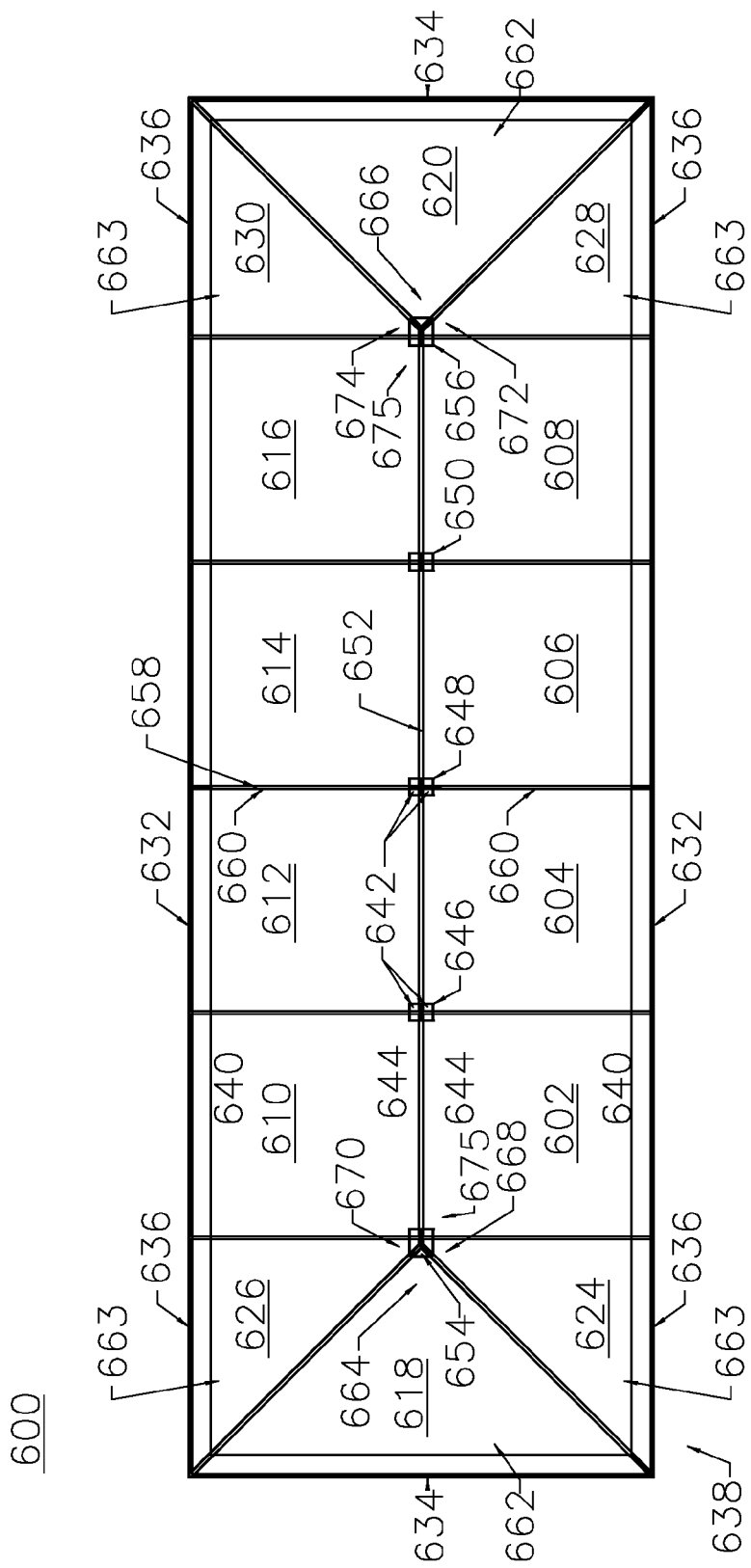
FIG. 28 is a top plan view of the skylight of FIG. 27.
Figure 37:
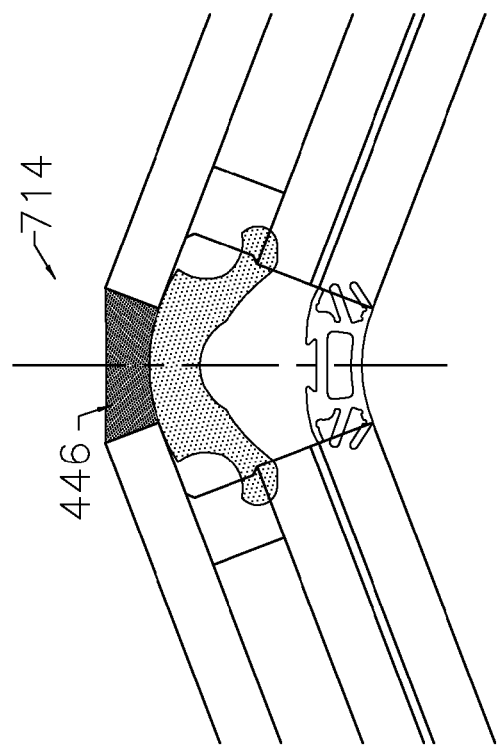
FIG. 37 is a cross sectional side view of the glass pieces interface at the hip transition for the skylight of FIG. 27.
Figure 36:
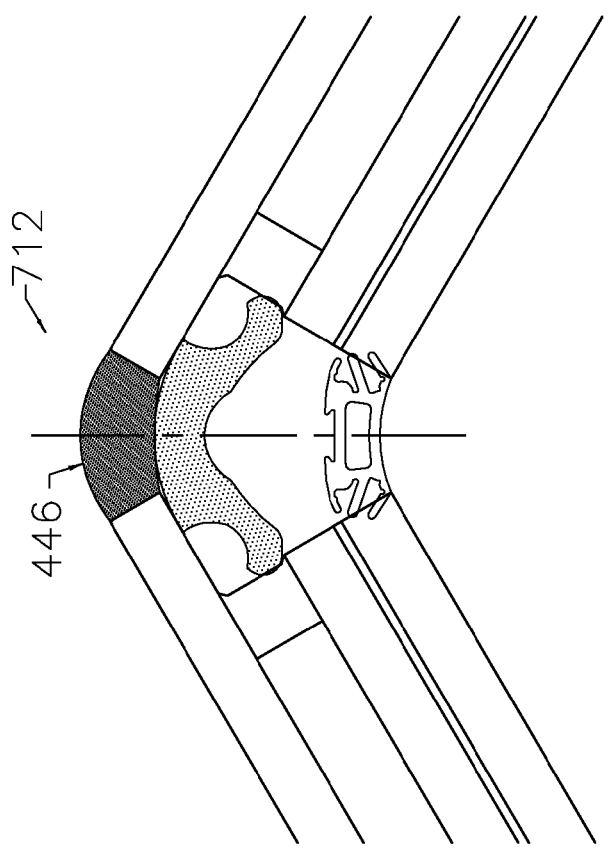
FIG. 36 is a cross sectional side view of the glass pieces interface at the peak for the skylight of FIG. 27.
Figure 38:
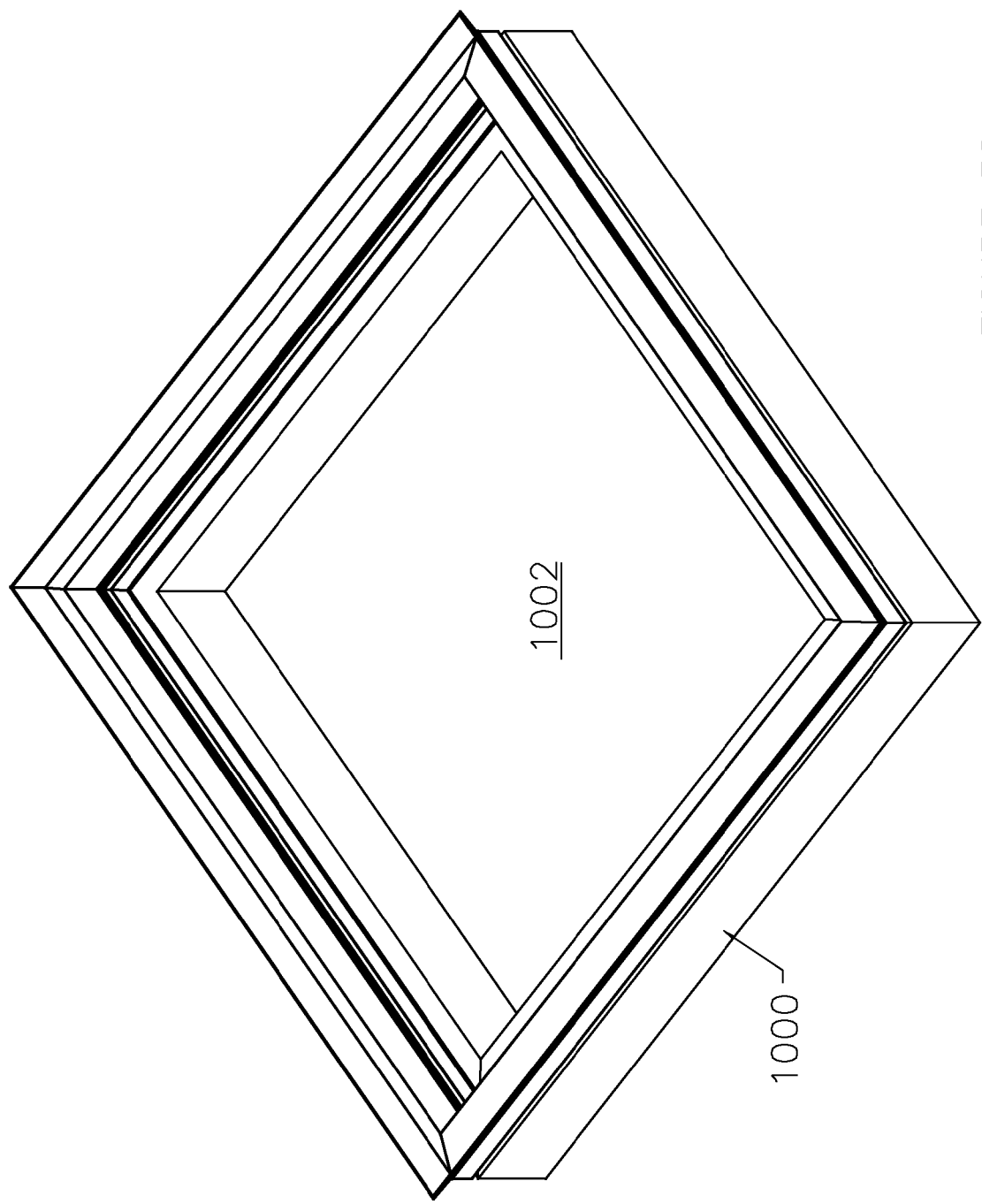
FIG. 38 is a perspective view of the support frame used in making a pyramid-shaped skylight.
Figure 39:
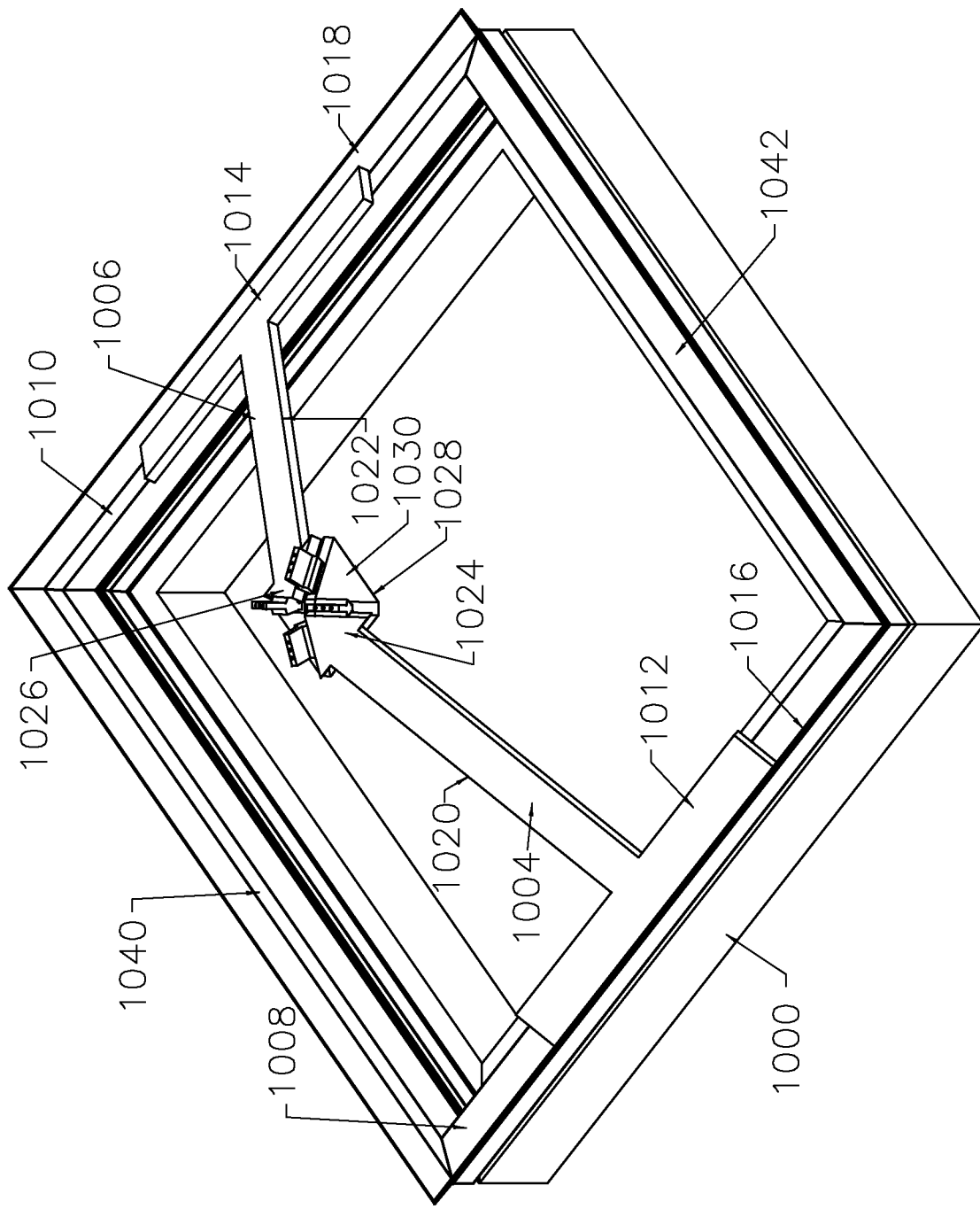
FIG. 39 is a perspective view of the glass installation support used in making the pyramid-shaped skylight.
Figure 40:
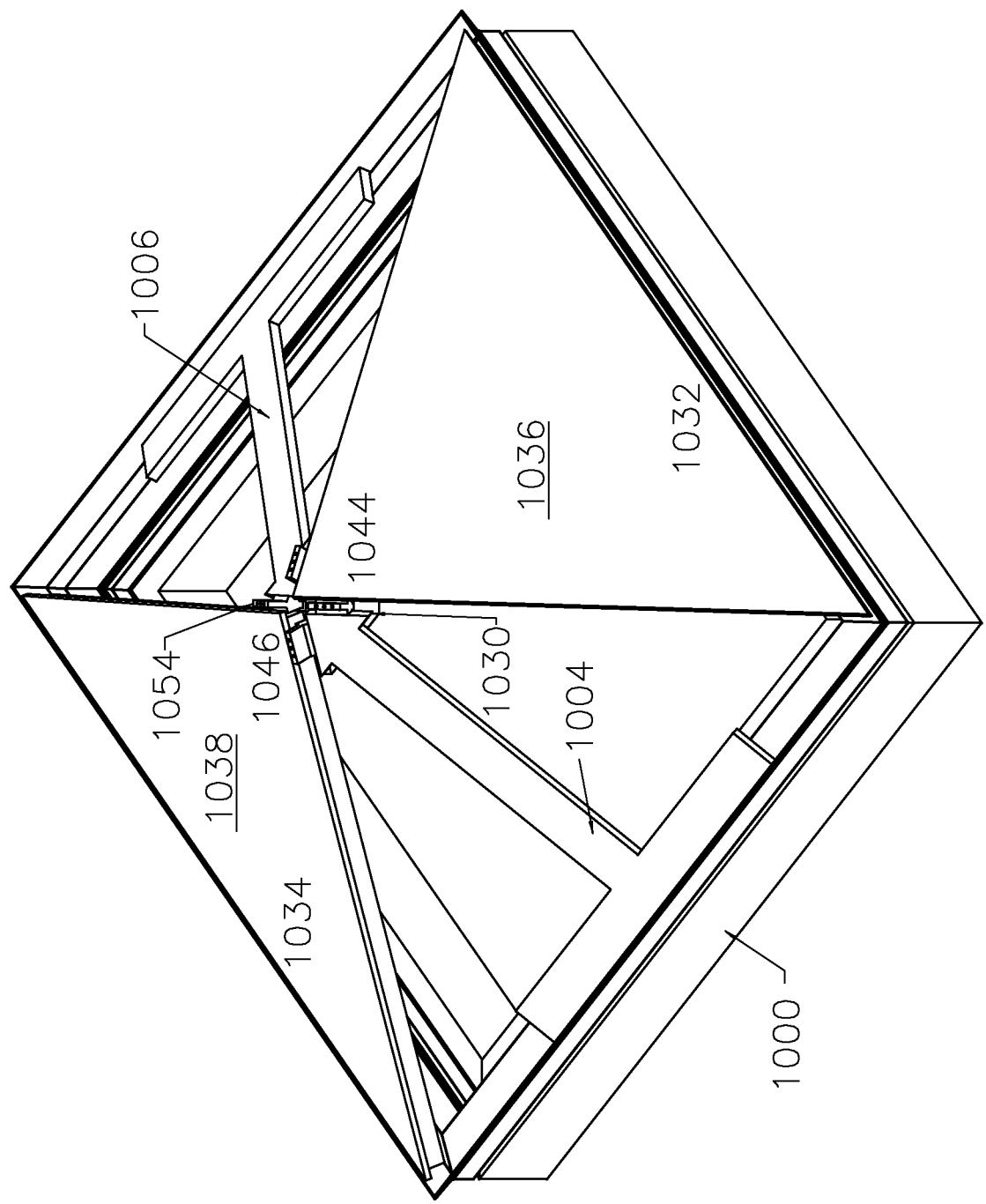
FIG. 40 is a perspective view of two pieces of glass on the installation support as part of the process used in making the pyramid-shaped skylight.
Figure 41:
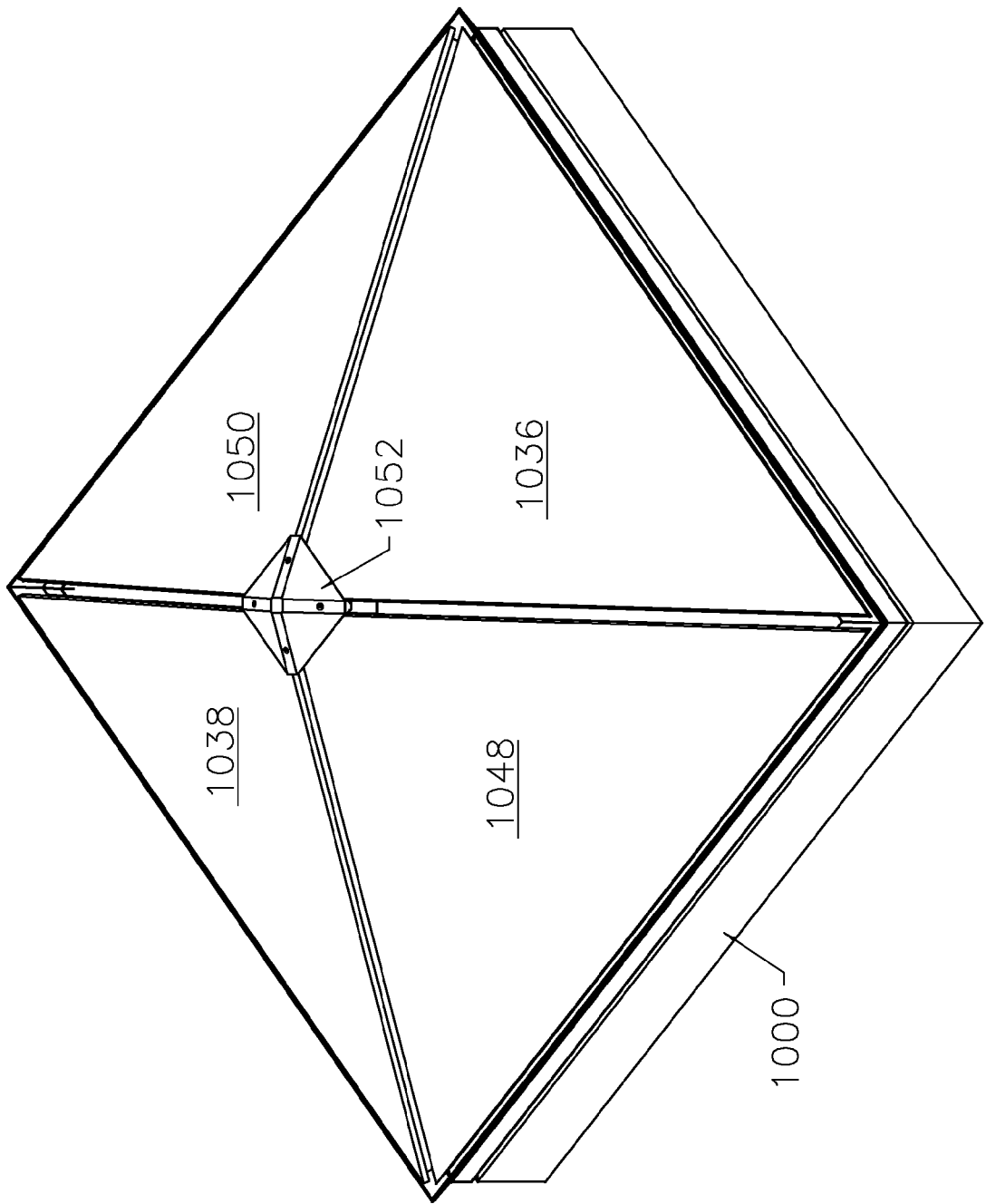
FIG. 41 is a perspective view of the pyramid-shaped skylight using the assembly process of the present invention.

The patch space 96 is further established by one or more patch positioning keys 106. Two are shown in the side view of FIG. 9. In general, the number of patch positioning keys 106 of the apex patch fitting 20 may correspond in number to the number of glass pieces secured to the apex patch fitting 20, although deviation from that ratio is possible in some situations. This comment applies for all apex patch fittings and patch positioning keys described herein. The patch positioning key 106 is a shaped element having an upper section 108 and a lower section 110. The upper section 108 and the lower section 110 combine to form a polygonal shape when viewed in cross section as shown in FIG. 8, with an upper pilot hole 120 for receiving a retaining element such as threaded bolt 112, which joins the positioning key 106 to the outer patch member 92. The lower section 110 is configured so that its perimeter 114 is substantially in parallel with inner peak section 116 of the peaks 24 of the glass pieces 11-16 and spaced therefrom by flexible patch block 118. The lower section has two lower pilot holes 121 for receiving the retaining element such as threaded bolt 112 to join the positioning key 106 to the inner patch member 94. As shown in FIG. 9, each patch positioning key 106 has three pilot holes in total, for receiving therein one retaining element through the outer patch member 92 and two retaining elements through inner patch member 94. With the glass peaks 24 placed between the outer member 92 and the inner member 94 and the positioning key 106 in the patch space 96, the glass pieces 11-16 may be adjusted until in a desired position before the joining elements 104 are secured to the respective members 92 and 94 and the glass pieces 11-16 fixed in place.

The configuration of the apex patch fitting 20 with the patch positioning key 106, and more generally for all of the apex patch fittings with patch positioning keys described herein, establishes structural support for glass. This configuration may be used at an apex of a skylight or other type of glass structure. The configuration of a patch fitting with a patch positioning key as described may more generally be used to secure one or more glass pieces, whether specifically at an apex of a structure or not.

Spaces 124 between adjacent glass pieces 11-16 are sealed with the hip sealing component 26 that includes an interior trim gasket 128 and a backer rod 130. The trim gasket 128 and the backer rod 130 extend substantially the length of the space 124. The trim gasket 128 is made of a relatively soft material, such as rubber having a hardness of about 70 Shore A durometer. The trim gasket 128 is a shaped piece including flexible legs 132 that, with the softness of the material, ensures that the gasket 128 remains in substantial contact with ends 134 and 136 of adjacent pieces of glass even if the space between varies to an extent from one end to the other of the space 124. The gasket 128 may be fabricated of other materials and of different shapes as long as that gap filling element takes up the area of the space 124 between the inner portions of adjacent pieces of glass sufficiently to provide a reasonable thermal seal.

The backer rod 130 is used to fill a portion of the space 124 in middle and outer regions between the adjacent pieces of glass with an insulative material that provides a substrate for a sealing material, such as silicone, to provide an outer seal 138 of the hip sealing member 26. Prior configurations of such types of skylights not only had large metal pieces to enclose the space 124. The metal used to fill the gap in such prior configurations would facilitate thermal transfer from outside to inside. The backer rod 130 is flexible enough to accommodate angle variances between infill panels (glass shown here) and facilitates the use of cured sealants such as silicone.

The polygon-shaped skylight formed of the skylight system 200 represented in FIGS. 11-16 includes eight pieces of glass 202, 204, 206, 208, 210, 212, 214 and 216 retained on a support frame 218 wherein the polygon is a peaked octagonal shape. It is to be understood that the polygon may have more or fewer sides and the description of the octagon form substantially remains the same for other polygons. The glass pieces 202-216 are further retained together in an angled position with respect to the support frame 218 with an apes patch fitting 220. Each of the glass pieces 202-216 is of substantially the same dimensions. They are triangular in shape, including a base 222 and a peak 224. Each piece forms one eighth of the coverage of the skylight. The base 222 of each piece of glass is set on and retained to the support frame 218 and the peak 224 of each piece of glass is set in and retained to the apex patch fitting 220. Each piece of glass is spaced from an adjacent piece of glass by a hip sealing member 226. The pieces of glass 202-216 are sized to create the skylight of desired size.

The support frame 218 is an octagon including eight sections 228, 230, 232, 234, 236, 238, 240 and 242, wherein each section 228-242 supports an individual one of the glass pieces 202-216. Each of the sections 228-242 includes a sill member 244, a setting chair 246, and one or more setting blocks 248. These components of the sections 228-242 are separable but one or more may be part of a unitary structure. The sill member 244 is a shaped piece that may be fabricated of Aluminum or other material suitable to withstand an outside environment for a long period of time. Each sill member 244 has a length that is slightly more than the length of the base 222 of one of the glass pieces 202-216. The sill member 244 is essentially the same as the sill member 46 of the system 10. It includes a first leg 250, a second leg 252, a third leg 254 and a fourth leg 256. The first leg 250 is configured to rest on an underlying surface 25S where the skylight is to be installed. The first leg 250 includes a condensate trap flange 260 to establish a condensation evaporation channel 262. A sill attachment element, such as a threaded bolt 264, is used to fixedly attach the sill member 244 to the underlying surface 258.

The second leg 252 of the sill member 244 extends upwardly at a right angle from end 266 of the first leg 250. The second leg 252 has an angled upper section 268 that extends to the third leg 254. The third leg 254 extends downwardly from the upper section 268 of the second leg 252 and terminates at a chair retaining region 270. The chair retaining region 270 includes a chair support slot 272 that includes an inlet section 274 and a retaining shoulder 276 with an underlying retaining space 278, the combination of which provides a retainer for setting the position of the setting chair 246. A glass piece of the glass pieces 202-216 of the skylight is set on surface 280 of the third leg 254.

The fourth leg 256 extends downwardly from the chair retaining region 270 of the third leg 254. The fourth leg 256 terminates with an insulation support flange 282, which also acts as a sealing surface. The fourth leg 256 is substantially parallel to the second leg 252 but it is shorter than the second leg 252. When the sill member 244 is in position on the surface 258, the fourth leg 256 does not contact the surface 258. The difference in the height of the fourth leg 256 at the chair retaining region 270 and the second leg 252 at the upper section 268 defines the angle of the glass piece when in position on the surface 280 of the third leg 254 with respect to the underlying surface 258. In the version of the octagon-shaped skylight represented in FIGS. 11-16, that angle is about 30°. Other angles are possible and may be established by the height difference between the second leg 252 and the fourth leg 256. Space 283 between the second leg 252 and the fourth leg 256 may be filled with insulation if desired.

The system 200 further includes for each of the eight vertices of the skylight a corner key 284 having an inside angle of about 135°. The corner key 284 is an angled bar that when placed at an interface of adjacent ones of the sections 228-242 sets the vertex and joins those sections together with attachment elements such as threaded bolts 286. The corner key 284 is configured to fit into corner key slot 286 located at underside 288 of third leg 254 adjacent to second leg 252. Each leg of the corner key 284 extends about three inches along the length of adjacent ones of sections 228-242 but is not limited thereto.

The setting chair 246 is a substantially flat bar that includes a base 290 extending its entire length. The setting chair 246 has a length substantially the same as the sill member 244. The base 290 includes a retaining flange 292 and a retaining nose 294. When the setting chair 246 is set in position on the sill member 244, the retaining nose 294 extends into the inlet section 274 under the retaining shoulder 276 and into the retaining space 276 of the third leg 254 of the sill member 244. At that time, the retaining flange 292 rests on the edge of the interface of the third leg 254 and the fourth leg 256 of the sill member 244.

The setting chair 246 establishes the perimeter and support for the base 222 of the glass piece. The base 222 is separated from the setting chair 246 by one or more setting blocks 248 that are positioned in space 282. The setting blocks 248 may extend substantially the entire length of the setting chair 246 or it may be established by a plurality of pieces that are spaced from one another along the length of the setting chair 246. The base 222 of each piece of glass may be joined to the sill member 244 with structural glaring tape or structural silicone, for example.

The base 222 of each of the glass pieces 202-216 rests on the setting blocks 248 and each of the pieces extends to an apex 296 where the peaks 224 of each glass piece 202-216 are retained together with the apex patch fitting 220. The apex patch fitting 220 includes an outer patch member 298 and an inner patch member 300 establishing a patch space therebetween. Except with respect to its particular size and shape, the apex patch fitting 220 is configured essentially the same as the apex patch fitting 20 of the system 10 shown in FIGS. 1-11. In particular, an underside of the outer patch member 298 and an upper side of the inner patch member 300 includes an apex patch fitting gasket affixed thereto. The distance between the gasket of the outer patch member 298 and the gasket of the inner patch member 300 is determined by the thickness of the glass pieces 202-216. The apex patch fitting members 298 and 300 are joined together with joining members such as threaded bolts 302 that are located between adjacent pieces of glass 202-216.

The space between the outer member 298 and the inner member 300 is further established by the patch positioning key previously described, which description is incorporated herein. With the glass peaks 224 placed between the outer member 298 and the inner member 300 and the positioning key in the patch space, the glass pieces 202-216 may be adjusted until in a desired position before the joining elements 302 are secured to the respective members 298 and 300 and the glass pieces 202-216 fixed in place. Spaces between adjacent glass pieces 202-216 are sealed with the hip sealing member 226 that includes the same components and corresponds with the function and configuration of the hip sealing member 26 of the system 10. The description of the hip sealing member 26, including reference to the trim gasket and the backer rod, is incorporated here with respect to the arrangement and function of the hip sealing member 226.

The ridge-shaped skylight formed of the skylight system 400 represented in FIGS. 17-26 includes 12 pieces of glass 402-424 retained on a support system 426. This is just one example of a ridge-shaped skylight. Other versions with more or fewer pieces of glass are contemplated. Each of the glass pieces 402-424 are further retained together in an angled position with respect to the support system 426 with apex patch fittings 428-436, one at each intersection of the peaks of four pieces of glass similar to the configuration of the apex patch fitting 20 of system 10. Each of the glass pieces 402-424 is of substantially the same dimensions as shown; however, they may vary. Each piece of glass is substantially square in shape and includes a base side 438, a peak side 440 opposing the base side 438 and two opposing sides 442 and 444. Each piece forms a section of coverage of the skylight. It is to be noted that the configuration of the combination of components of the system 400 may be used to make a skylight that extends for any selectable length to form the entire ridge of a building structure having almost any length. That is, the system 400 can be used to replace the roof ridge of a building.

The base side 438 of each piece of glass is set on and retained to the support system 426 and the peak side 440 of each piece of glass is set in and retained to a corresponding one of the apex patch fittings 428-436. Each piece of glass is spaced from an adjacent piece of glass by a ridge sealing component 446. The pieces of glass 402-424 are sized to create the skylight of desired size.

The support system 426 includes a first base support 448, a second base support 450, a first edge support 452 and a second edge support 454. The first base support 448 is configured to support the base side 438 of glass pieces 402-412 and the second base support 450 is configured to support the base side 438 of glass pieces 414-424. The first edge support 452 is configured to support the opposing side 442 of glass pieces 402 and 414, and the second edge support 454 is configured to support the opposing side 444 of glass pieces 412 and 424. As noted, additional glass pieces may be added on each side of a roof peak and the first base support 448 and the second base support 450 would simply be extended.

Each of the first base support 448 and the second base support 450 is made up of a plurality of individual base support sections 456 wherein individual base support sections 456 may span and support multiple glass pieces. Each base support section 456 includes a sill member 458, a setting chair 460, and one or more setting blocks 462. These components of the base support section 456 are separable but one or more may be part of a unitary structure. The sill member 458 is a shaped piece that may be fabricated of Aluminum or other material suitable to withstand an outside environment for a long period of time. The sill member 458 includes a first leg 464, a second leg 466, a third leg 468 and a fourth leg 470. The first leg 464 is configured to rest on an underlying surface 472 where the skylight is to be installed. The first leg 464 includes a condensate trap flange 474 to establish a condensation evaporation channel 476. A sill attachment element, such as a threaded bolt 478, is used to fixedly attach the sill member 458 to the underlying surface 472.

The second leg 466 of the sill member 458 extends upwardly at a right angle from end 480 of the first leg 464. The second leg 466 extends at a right angle away from the first leg 464 to the third leg 468. The third leg 468 extends from the second leg 466 and terminates at a chair retaining region 482. The chair retaining region 482 includes a chair support slot 484 that includes an inlet section 486 and a retaining shoulder 488 with an underlying retaining space 490, the combination of which provides a retainer for setting the position of the setting chair 460. A glass piece of the glass pieces 402-424 of the skylight is set on surface 492 of the third leg 468.

The fourth leg 470 extends downwardly at a right angle from the chair retaining region 482 of the third leg 468. The fourth leg 470 terminates with an insulation support flange 494, which also acts as a sealing surface. The fourth leg 470 is substantially parallel to the second leg 466 but it is shorter than the second leg 466. When the sill member 458 is in position on the surface 472, the fourth leg 470 does not contact the surface 472. The configuration of the sill member 458 establishes the position of the glass piece as substantially parallel to the underlying surface 472. Space 496 between the second leg 466 and the fourth leg 470 may be filled with insulation if desired.

The first edge support 452 and the second edge support 454 each includes a respective set of two edge support sections 498. Each edge support section 498 supports a respective one of opposing side 442 of glass pieces 402, 412, 414 and 424. Each edge support section 498 supports the respective sides 442 of each of those pieces of glass in the way that the base support sections 456 support the base sides 438 of the glass pieces 402-424. They include an end sill member, an end setting chair and one or more end setting blocks, each corresponding to the sill member 458, the setting chair 460, and the one or more setting blocks 462 described herein. Each of the edge support sections 498 includes corner transitions where the edge support sections 498 are joined to the base support sections 456 of glass pieces 402, 412, 414 and 424. That joining is accomplished using at each of those corner interfaces a substantially right angle corner key 500. The corner key 500 is a bar that when placed at the interface of the edge support sections 498 and the base support sections 456 where indicated. It sets the corner and joins those sections together with attachment elements such as threaded bolts 502. The corner key 500 is configured to fit into corner key slot 504 located at underside 506 of third leg 468 adjacent to second leg 464. Each leg of the corner key 500 extends about three inches along the length of adjacent ones of sections 456 and 498 but is not limited thereto.

For the glass base and edge supports, the setting chair 460 is a substantially flat bar that includes a base 508 extending its entire length. The setting chair 460 has a length substantially the same as the sill member 458. The base 508 includes a retaining flange 510 and a retaining nose 512. When the setting chair 460 is set in position on the sill member 458, the retaining nose 512 extends into the inlet section 486 under the retaining shoulder 488 and into the retaining space 490 of the third leg 468 of the sill member 458. At that time, the retaining flange 510 rests on the edge of the interface of the third leg 468 and the fourth leg 470 of the sill member 458.

The setting chair 458 establishes the perimeter and support for the base side 438 of all of the glass pieces and the opposing side 442 of edge glass pieces 402, 412, 414 and 424. The base side 438 and the opposing side 442 are each separated from the setting chair 458 by one or more setting blocks 462 that are positioned in space 511. The setting blocks 462 may extend substantially the entire length of the setting chair 458 or they may be established by a plurality of pieces that are spaced from one another along the length of the setting chair 458. The base side 438 and the opposing side 442 may be joined to the sill member 458 with structural glazing tape or structural silicone, for example.

The base side 438 of each of the glass pieces 402-424 rests on the setting blocks 462 and each of the pieces extends to an apex 514 where interior corners 516 of the peak side 440 of each glass piece 402-424 are retained together by a respective one of apex patch fittings 428-436 in sets of four where those corners meet. Each of the apex patch fittings 428-436 includes an outer patch member 518 and an inner patch member 520 establishing a patch space 526 therebetween. An underside 528 of the outer patch member 518 and an upper side 530 of the inner patch member 520 includes an apex patch fitting gasket 522 affixed thereto. The distance between the gasket 522 of the outer patch member 518 and the gasket 522 of the inner patch member 520 is determined by the thickness of the glass pieces 402-424. The apex patch fitting members 518 and 520 are joined together with joining members such as threaded bolts 534 and 544 that are located between adjacent pieces of glass 402-424. There may also be anti-walk setting blocks 524 between the glass pieces at these locations.

The patch space 526 is further established by one or more patch positioning keys 528. The patch positioning key 528 is a shaped element having an upper section 530 and a lower section 532. The upper section 530 and the lower section 532 combine to form a polygonal shape when viewed in cross section in FIG. 19, with an upper pilot hole 537 for receiving a retaining element such as threaded bolt 534, which joins the positioning key 528 to the outer patch member 518. The lower section 532 is configured so that its perimeter 536 is substantially in parallel with inner peak section 538 of the interior corners 516 of the peak sides 440 of the glass pieces 402-424 and spaced therefrom by flexible patch block 540. The lower section 532 has two lower pilot holes for receiving therein a retaining element such as threaded bolt 544, which joins the positioning key 528 to the inner patch member 520. With the interior corners 516 of the glass pieces 402-424 placed between the outer member 518 and the inner member 520 and the positioning key 528 in the patch space 526, the glass pieces 402-424 may be adjusted until in a desired position before the retaining elements 534 and 544 are secured to the respective members 518 and 520 and the glass pieces 402-424 fixed in place to establish a ridge for the building to which the skylight is applied.

Spaces 546 between the peak sides 440 of glass pieces 402-424 at the peak of the skylight between respective ones of the apex patch linings 428-436, as well as space 548 between apex patch fitting 428 and the first edge support 452 and space 550 between apex patch fitting 436 and second edge support 454 are sealed with the ridge sealing component 446 that includes an interior trim gasket 554 and a backer rod 556. The trim gasket 554 and the backer rod 556 extend substantially the lengths of spaces 546-550. The trim gasket 554 is made of a relatively soft material, such as rubber having a hardness of about 70 Shore A durometer. The trim gasket 554 is a shaped piece including flexible legs 558 that, with the softness of the material, ensures that the gasket 554 remains in substantial contact with ends 560 and 562 of adjacent pieces of glass even if the space and/or angles between vary to an extent from one end to the other of the spaces 546-550. The gasket 554 may be fabricated of other materials and of different shapes as long as that gap filling element takes up the area of the spaces 546-550 between the inner portions of adjacent pieces of glass sufficiently to provide a reasonable thermal seal.

The backer rod 556 is used to fill a portion of the spaces 546-550 in middle and outer regions between the adjacent pieces of glass with an insulative material that provides a substrate for a sealing material, such as silicone, to provide an outer seal 564 of the ridge sealing component 446.

The system 400 further includes components to secure and seal the skylight at the ends of the ridge-shaped skylight, which ends may also be referred to herein as the edges. Adjacent ones of the edge support sections 498 meeting at end peak 566 establish an edge support interface 568. The edge support interface 568 extends from an upper interface area 570 to a lower interface area 572. Adjacent sill members 458 of the edge support sections 498 are mechanically joined together with an edge splice plate 574 and mechanical connectors such as threaded bolts 576 adjacent to where mechanical connectors such as threaded bolts 578 join the sill members 458 to the underlying surface 472. The edge splice plate 574 spans the edge support interface 568 and is joined to each of the adjacent sill members 458. The edge splice plate 574 is an angled plate wherein die angle is determined by the desired slope of the roof of the building to which the system 400 is applied. The upper interface area 570 is sealed with the ridge sealing member 552 or, alternatively, with a sealing material as described herein. The lower interface area 572 is sealed with a sealing material, such as silicone, or another material suitable to minimize thermal and moisture intrusion to the underlying surface 472.

The system 400 also includes arrangements for sealing space 580 between adjacent ones of the base support sections 456. Specifically, adjacent sill members 458 of the base support sections 456 are mechanically joined together with a sill splice plate 581 and mechanical connectors such as threaded bolts 582 adjacent to where the threaded bolts 478 join the first leg 464 of the sill member 458 to the underlying surface 472. The sill splice plate 581 spans the sealing space 580 wherein the sill members 458 meet. The sealing space 580 is sealed with a sealing material such as silicone, or another material suitable to minimize thermal and moisture intrusion to the space under the glass pieces 402-424. Further, space 584 between adjacent glass pieces 402-424 away from the peak of the skylight are sealed with the ridge sealing member 26 described herein with respect to system 10. The description of the ridge sealing member 26, including reference to the trim gasket and the backer rod, is incorporated here with respect to the arrangement and function of the ridge sealing member for the space 584.

Those skilled in the art will recognize that a single-slope skylight may be fabricated with some of the components used to make the ridge-shaped skylight of the system 400. Such a single-slope skylight would have a single set of glass pieces sharing the same plane with the roof of a building. The base sides and opposing sides of the glass pieces would be supported, secured and sealed in the manner described herein with respect to the first base support 448, the first edge support 452 and the second edge support 454. Truncated apex patch fittings like apex patch fittings 428-436 may be employed to secure the sides of the glass pieces and adjacent glass pieces may be joined and sealed with respect to one another as described with respect to the system 400.

The hipped ridge-shaped skylight formed of the skylight system 600 represented in FIGS. 27-37 includes eight rectangularly-shaped glass pieces 602-616, two isosceles-shaped glass pieces 618 and 620, and four right triangle-shaped 12 pieces of glass 624-630. The system 600 also includes ridge base support sections 632, end base support sections 634 and transition base support sections 636. While shown having eight rectangularly-shaped glass pieces, the skylight of the system 600 may have more or fewer such pieces and so, accordingly, the length of the skylight is not limited to the dimensions associated with the specific number of glass pieces shown. Longer skylights of hipped ridge design are possible with the present invention.

The eight glass pieces 602-616 are positioned on underlying surface 638 and affixed thereto at their base sides 640 with the ridge base support sections 632 used to fix them in place on the surface 638 in the same manner as described herein with respect to the base support sections 456 of system 400. The description of that arrangement is incorporated herein by reference with respect to placement and joining of glass pieces 602-616. Interior corners 642 of peak sides 644 of the glass pieces 602-616 are joined together with first apex patches 646-650 in the same manner as described herein with respect to the apex patch fittings 428-436 of system 400. The description of that arrangement is incorporated herein by reference. Further, peak spaces 652 between the peak sides 644 and between respective apex patches 646-650, as well as peak spaces 652 between first apex patch fitting 646 and second apex patch fitting 654 and between first apex patch tiding 650 and second apex patch fitting 656 are sealed in the same manner as described with respect to the sealing of spaces 546 of the system 400. The description of that arrangement is incorporated herein by reference. Yet further, spaces 658 between sides 660 of adjacent pieces of glass 602-616 are sealed in the same manner as described with respect to the sealing of the equivalent spaces of the system 400.

The two glass pieces 618 and 620 are positioned on underlying surface 638 and affixed thereto at their bases 662 with the end base support sections 634 used to fix them in place on the surface 638 in the same manner as described herein with respect to the base support sections 28-34 of system 10. The description of that arrangement is incorporated herein by reference with respect to placement and joining of glass pieces 618 and 620.

The four glass pieces 624-630 are positioned on underlying surface 638 and affixed thereto at their bases 663 with the transition base support sections 636 used to fix them in place on the surface 638 in the same manner as described herein with respect to the base support sections 28-34 of system 10. The description of that arrangement is incorporated herein by reference with respect to placement and joining of glass pieces 618 and 628.

Peaks 664 and 666 of glass pieces 618 and 620 are joined together with peaks 668-674 of glass pieces 624-630 and with exterior corners 675 of glass pieces 602, 608, 610 and 616 using second apex patch fittings 654 and 656.

Each of the second apex patch fittings 654 and 656 includes an outer patch member 676 and an inner patch member 678 establishing a patch space 680 therebetween. An underside 682 of the outer patch member 676 and an upper side 684 of the inner patch member 678 includes an apex patch fitting gasket 686 affixed thereto. The distance between the gasket 686 of the outer patch member 676 and the gasket 686 of the inner patch member 678 is determined by the thickness of the glass pieces 602, 608, 610, 616, 618 and 624-630. The apex patch fitting members 676 and 678 are joined together with joining members such as threaded bolts 700 and 710 in the manner described with respect to other apex patch fittings of the invention.

The apex patch fitting members 676 and 678 are sized and shaped to accept and retain therein peaks of the three different types of glass of the system 600. In particular, the members 676 and 678 include two opposing transition sections 688 and 690 and an end section 692. The opposing transition sections 688 and 690 of the outer patch member 676 and the inner patch member 678 are configured to receive and retain therebetween the exterior corners of the rectangular shaped glass pieces 602, 608, 610 and 616, and the peaks of the transition glass pieces 624-630. The end sections 692 of the outer patch member 676 and the inner patch member 678 are configured to receive and retain therebetween the peaks of the end glass pieces 618 and 620.

The patch space 680 is further established by a plurality of patch positioning keys 694. The patch positioning key 694 is a shaped element having an upper section 696 and a lower section 698. The upper section 696 and the lower section 698 combine to form a polygonal shape when viewed in cross section as shown in FIG. 29, with a pilot hole interior for receiving a retaining element such as threaded bolt 700, which joins the positioning key 694 to the outer patch member 676. In a manner as previously described with respect to other patch positioning keys of other apex patch fittings. The lower section 698 is configured so that its perimeter 702 is substantially in parallel with inner peak section 704 of the exterior corners 676 of the peak sides of the glass pieces 402-424 and spaced therefrom by flexible patch block 706. The lower section 698 also has a port 708 for retaining therein a retaining element such as threaded bolt 710, which joins the positioning key 694 to the inner patch member 678. With the exterior corners 675 of the glass pieces 602, 608, 610 and 616, and the peaks of glass pieces 618-630 placed between the outer member 676 and the inner member 678 and the positioning key 694 in the patch space 680, the glass pieces may be adjusted until in a desired position before the retaining elements 700 and 710 are secured to the respective members 676 and 678 and the glass pieces fixed in place.

Interfaces between adjacent pieces of glass may be joined and/or scaled as previously described herein with respect to other glass interfaces of systems 10, 200 and 400. For example, the ridge sealing component 446 may be used to seal ridge interfaces 712 between peak sides of adjacent glass members 602-616 at the peak and a similar form of it may be used at hip interfaces 714. Further, as noted, spaces between adjacent pieces of glass at the sides thereof may be sealed in the manner described herein with respect to other adjacent pieces of glass located on the same plane.

An example method of making a skylight is described with respect to FIGS. 38-41. The figures illustrate primary steps for making a pyramid-shaped skylight; however, it is to be understood that similar steps may be used to make skylights of other shapes. In the method, a support frame 1000, such as the support frame 18 of system 10, is affixed to a substrate 1002. Next, a first apex patch fitting retainer jig 1004 and a second apex patch fitting retainer jig 1006 are placed, but not secured, on opposing sills 1008 and 1010 of the support frame 1000. Each of the jigs 1004 and 1006 includes a base 1012/1014 arranged to contact and be on the sills 1008 and 1010 and butted up against setting chairs 1016 and 1018 of those sills 1008 and 1010. When the jigs 1004 and 1006 are placed on the support frame 1000, the bases 1012 and 1014 are substantially centered on the sills 1008 and 1010, respectively.

The jig 1004/1006 further includes a body 1020/1022 extending substantially from the center of the base 1012/1014 at or close to a right angle. The body 1020/1022 terminates with a bead 1024/1026 approximating in dimensions the peak of a piece of glass that is to form part of the skylight. The bead 1024/1026 may be triangular as shown, as part of the process of making a pyramid-shaped skylight, or it may be of a different shape dependent on the particular skylight's shape. For example, it may be square for a ridge-shaped skylight or trapezoidal for a hipped ridge. The length of the body 1030/1022 is adjustable to account for glass pieces of different sizes.

With the heads 1024 and 1026 held up so that the bases 1012 and 1014 of the respective jigs 1004 and 1006 are substantially flat to the angled sills 1008 and 1010, lower member 1028 of an apex patch fitting of the type describe herein with respect to the system 10, is positioned under the respective heads 1024 and 1026 and the heads 1024 and 1026 are lowered until they rest on upper surface 1030 of the lower member 1028. In this condition, the lower member 1028 is suspended above the substrate 1002 effectively centered with respect to the support frame 1000. The opposing jigs 1004 and 1006 resting on sills 1008 and 1010 create a squeezing compressive force that keeps the lower member 1028 in a fixed position. The downward pressure associated with gravity ensures that the lower member 1028 remains in that position. Any additional downward force on the jigs 1004 and 1006 further forces the jigs 1004 and 1006 together and thereby further secures the lower member 1028 suspended in place.

With the lower member 1028 in place, bases 1032 and 1034 of two pieces of glass 1036 and 1038 are placed on opposing sills 1040 and 1042 of the support frame 1000 and peaks 1044 and 1046 of the glass pieces 1036 and 1038 are placed on the upper surface 1030 of the lower member 1028 in spaces adjacent to the heads 1024 and 1026 of the jigs 1004 and 1006. With the glass pieces 1036 and 1038 so placed, the jigs 1004 and 1006 can be removed and the lower member 1028 will remain in position, secured by the opposing downward forces of the opposing glass pieces 1036 and 1038 resting thereon. The removed jigs 1004 and 1006 may then be replaced on the lower member 1028 by remaining glass pieces 1048 and 1050 placed on the support frame 1000. Upper member 1052 of the apex patch fitting is then placed on the peaks of all of the glass members 1036, 1038, 1048 and 1050 and secured in place using a plurality of patch positioning keys 1054 such as the patch positioning keys 106 and the threaded bolts 104 of system 10, as well as the other joining components described herein. The glass pieces 1036, 1038, 1048 and 1050 are secured to the support frame 1000 as described herein and all interfaces sealed as described herein.

The present invention includes a kit for building and installing a skylight of selectable shape and dimensions. The kit includes the components described herein, although it may or may not include the glass pieces, which may be of custom size. The kit at least includes one or more apex patch fitting suitable for the desired skylight design, the support frame with accompanying hardware including one or more optional setting chairs, and the ridge sealing components. The kit may further include one or more of the apex patch fitting retainer jigs. The kit includes instructions for making/installing the skylight substantially in accordance with the method described with respect to FIGS. 38-41, which instructions may be adjusted to account for the particular size and shape of the desired skylight.

It is to be understood that various modifications may be made to the system 10 and the components described herein without departing horn the spirit and scope of the invention. Accordingly, other embodiments are within the scope of the claims appended hereto.

What is claimed is:

1. A patch fitting comprising:
   a. an upper body;
   b. a lower body; and
   c. one or more patch positioning keys that join together the upper body and the lower body, wherein the one or more patch positioning keys space the upper body from the lower body, wherein each of the one or more patch positioning keys includes an upper section and a lower section,
   wherein the upper body and the lower body are of substantially the same shape and orientation with respect to one another and wherein the upper body and the lower body extend to cover an upper space and a lower space between adjacent pieces of glass,
   wherein the lower section of each of the one or more patch positioning keys is configured so that it has opposites sides substantially in parallel with inner peak sections of peaks of the adjacent pieces of glass, and
   wherein the upper body, the lower body and the one or more patch positioning keys structurally support the pieces of glass.

2. The patch fitting of claim 1 wherein each of the upper body and the lower body includes an apex patch fitting gasket affixed thereto.

3. The patch fitting of claim 1 further comprising one or more joining members for joining together the upper body and the lower body.

4. The patch fitting of claim 1, wherein the upper section of each of the one or more patch positioning keys is joined to the upper body of the patch fitting and the lower section of each of the patch positioning keys is joined to the lower body of the patch fitting.

5. The patch fitting of claim 4 wherein the upper section and lower section of each of the one or more patch positioning keys combine to form a polygonal shape in cross section.

* * * * *